United States Patent
Kim et al.

(10) Patent No.: US 12,524,115 B2
(45) Date of Patent: Jan. 13, 2026

(54) TOUCH DISPLAY DEVICE, DRIVING CIRCUIT, AND DRIVING METHOD

(71) Applicant: LG Display Co., Ltd., Seoul (KR)

(72) Inventors: HoonBae Kim, Paju-si (KR); NamYong Gong, Paju-si (KR); SungChul Kim, Paju-si (KR); SunYeop Kim, Paju-si (KR); SungYub Lee, Paju-si (KR); JongSung Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/971,463

(22) Filed: Dec. 6, 2024

(65) Prior Publication Data

US 2025/0216987 A1    Jul. 3, 2025

(30) Foreign Application Priority Data

Dec. 28, 2023  (KR) .................. 10-2023-0195168

(51) Int. Cl.
*G06F 3/041*  (2006.01)
*G06F 3/044*  (2006.01)

(52) U.S. Cl.
CPC ........ *G06F 3/04186* (2019.05); *G06F 3/0446* (2019.05); *G06F 2203/04108* (2013.01)

(58) Field of Classification Search
CPC ............... G06F 3/04166; G06F 3/0446; G06F 3/04186; G06F 2203/04108
See application file for complete search history.

(56) References Cited

U.S. PATENT DOCUMENTS

2015/0338964 A1* 11/2015 King .................. G06F 3/04166
345/174

* cited by examiner

*Primary Examiner* — Deeprose Subedi
(74) *Attorney, Agent, or Firm* — Seed Intellectual Property Law Group LLP

(57) ABSTRACT

Embodiments of the present disclosure is related to a touch display device, a driving circuit and a driving method thereof, and may provide a touch display device, a driving circuit and a driving method thereof capable of efficiently sensing a contact touch, a non-contact pointing touch pointing to a point on the screen (e.g., hover pointing touch), and a non-contact gesture with movement (e.g., hover gesture).

20 Claims, 21 Drawing Sheets

TOUCH DISPLAY DEVICE, DRIVING CIRCUIT, AND DRIVING METHOD

CROSS REFERENCE TO RELATED APPLICATION

This application claims priority from Korean Patent Application No. 10-2023-0195168, filed on Dec. 28, 2023, which is hereby incorporated by reference for all purposes as if fully set forth herein.

BACKGROUND

Technical Field

Embodiments of the present disclosure relate to a touch display device, a driving circuit, and a driving method of a touch display device.

Description of the Related Art

Recently, there has been developed a touch display device capable of detecting touch by a user's finger or pen to provide touch-based input processing functions.

In order for these touch display devices to provide more diverse application functions, there is a demand for various forms of touch sensing. For example, a wearable device may require not only a function to sense contact touch in the form of a user touching the screen, but also a function to sense non-contact touch (e.g., hover touch) in the form of a user not touching the screen.

BRIEF SUMMARY

Embodiments of the present disclosure may provide a touch display device, a driving circuit and a driving method capable of supporting various touch sensing modes.

Embodiments of the present disclosure may provide a touch display device, a driving circuit and a driving method capable of efficiently sensing a contact touch, a non-contact pointing touch (e.g., hover pointing touch) pointing to a point on a screen, and a non-contact gesture with a movement (e.g., hover gesture).

Embodiments of the present disclosure may provide a touch display device, a driving circuit and a driving method capable of efficiently sensing a non-contact pointing touch (e.g., hover pointing touch) pointing to a point on a screen, and a non-contact gesture with a movement (e.g., hover gesture).

Embodiments of the present disclosure may provide a touch display device, a driving circuit and a driving method having a control signal system capable of efficiently supporting three touch sensing modes including a contact touch mode, a hover pointing mode for sensing a non-contact pointing touch pointing to a point on a screen, and a hover gesture mode for sensing a non-contact gesture with movement, and a display mode.

A touch display device according to embodiments of the present disclosure may include a touch sensor including a plurality of touch electrodes, and a touch driving circuit configured to drive the touch sensor.

An operating mode of the touch display device may include a contact mode for sensing a contact touch and a hover mode for sensing non-contact touches.

The contact mode may include a display mode for displaying an image and a contact touch mode for sensing the contact touch.

The hover mode may include the display mode, a hover pointing mode for sensing a non-contact pointing touch pointing to a point on a screen among the non-contact touches, and a hover gesture mode for sensing a non-contact gesture with movement among the non-contact touches.

A first touch driving signal having a first amplitude may be applied to the touch sensor in the contact touch mode.

A second touch driving signal having a second amplitude different from the first amplitude may be applied to the touch sensor in the hover pointing mode.

A third touch driving signal having a third amplitude different from the first amplitude may be applied to the touch sensor in the hover gesture mode.

The second amplitude may be greater than the first amplitude, and the third amplitude may be greater than or equal to the second amplitude.

The plurality of touch electrodes may include a plurality of first touch electrodes and a plurality of second touch electrodes which intersect with each other.

In the contact touch mode, the plurality of first touch electrodes may be electrically separated from each other and the plurality of second touch electrodes may be electrically separated from each other.

In the hover pointing mode, n first touch electrodes among the plurality of first touch electrodes may be electrically connected to each other or a same second touch driving signal may be applied to the n first touch electrodes, and m second touch electrodes among the plurality of second touch electrodes may be electrically connected to each other.

In the hover gesture mode, k first touch electrodes among the plurality of first touch electrodes may be electrically connected to each other or a same third touch driving signal may be applied to the k first touch electrodes, and l second touch electrodes among the plurality of second touch electrodes may be electrically connected to each other.

A product of the n and the m may be greater than 1 and less than or equal to a product of the k and the l.

The display mode, the contact touch mode, the hover pointing mode, and the hover gesture mode may be distinguished by a first mode control signal, a second mode control signal, and a third mode control signal having different signal waveforms.

The first mode control signal may include different first level voltage section and second level voltage section, the second mode control signal may include different third level voltage section and fourth level voltage section, and the third mode control signal may include different fifth level voltage section and sixth level voltage section.

A driving circuit of a touch display device according to embodiments of the present disclosure may include a signal generation unit configured to generate a touch driving signal to be applied to at least one of a plurality of touch electrodes based on a reference touch driving signal depending on a touch sensing mode selected from among a plurality of touch sensing modes, and a signal output unit configured to output the touch driving signal to the at least one touch electrode.

The driving circuit may include a plurality of operating modes including a contact mode for sensing a contact touch and a hover mode for sensing non-contact touches.

The contact mode may include a display mode for displaying an image and a contact touch mode for sensing the contact touch. The hover mode may include the display mode, a hover pointing mode for sensing a non-contact pointing touch pointing to a point on a screen among the non-contact touches, and a hover gesture mode for sensing a non-contact gesture with movement among the non-contact touches.

The signal generation unit may generate the touch driving signal corresponding to a touch sensing mode selected among the plurality of touch sensing modes including the contact touch mode, the hover pointing mode, and the hover gesture mode, based on a plurality of mode control signals having different signal waveforms. For example, the plurality of mode control signals may include a first mode control signal, a second mode control signal, and a third mode control signal.

The touch driving signal may be a first touch driving signal having a first amplitude when the contact touch mode is selected as the touch sensing mode.

The touch driving signal may be a second touch driving signal having a second amplitude different from the first amplitude when the hover pointing mode is selected as the touch sensing mode.

The touch driving signal may be a third touch driving signal having a third amplitude different from the first amplitude when the hover gesture mode is selected as the touch sensing mode.

A driving method of a touch display device according to embodiments of the present disclosure may include a step of operating in a hover mode including a display mode, a hover pointing mode, and a hover gesture mode, a step of determining an intensity of a sensing signal for a touch sensor, a step of operating, if the intensity of the sensing signal is above a predetermined level, in a contact mode including a display mode and a contact touch mode, and performing a contact algorithm based on a result of operating in the contact mode to determine a coordinate for a contact touch, a step of determining, if the intensity of the sensing signal is lower than the predetermined level, whether or not there is a movement characteristic based on the sensing signal, a step of determining, if there is no movement characteristic based on the sensing signal, a coordinate for a hover touch while operating in the hover mode, and a step of determining, if there is a movement characteristic based on the sensing signal, a hover gesture while operating in the hover mode.

A first touch driving signal having a first amplitude may be applied to the touch sensor while the contact touch mode is in progress.

A second touch driving signal having a second amplitude different from the first amplitude may be applied to the touch sensor while the hover pointing mode is in progress.

A third touch driving signal having a third amplitude different from the first amplitude may be applied to the touch sensor while the hover gesture mode is in progress.

The second amplitude may be greater than the first amplitude, and the third amplitude may be greater than or equal to the second amplitude.

According to embodiments of the present disclosure, it is possible to provide a touch display device, a driving circuit and a driving method capable of supporting various touch sensing modes.

According to embodiments of the present disclosure, it is possible to provide a touch display device, a driving circuit and a driving method capable of efficiently sensing a contact touch, a non-contact pointing touch pointing to a point on a screen (e.g., hover pointing touch), and a non-contact gesture with a movement (e.g., hover gesture).

According to embodiments of the present disclosure, it is possible to provide a touch display device, a driving circuit and a driving method having a control signal system capable of efficiently supporting three touch sensing modes including a contact touch mode, a hover pointing mode for sensing a non-contact pointing touch pointing to a point on a screen, and a hover gesture mode for sensing a non-contact gesture with movement, and a display mode.

According to embodiments of the present disclosure, there may provide a low-power operation by efficiently performing various operating modes, such as a display mode, a contact touch mode, a hover pointing mode, and a hover gesture mode, in terms of operation time.

BRIEF DESCRIPTION OF THE SEVERAL
VIEWS OF THE DRAWINGS

DETAILED DESCRIPTION

Figure 1:
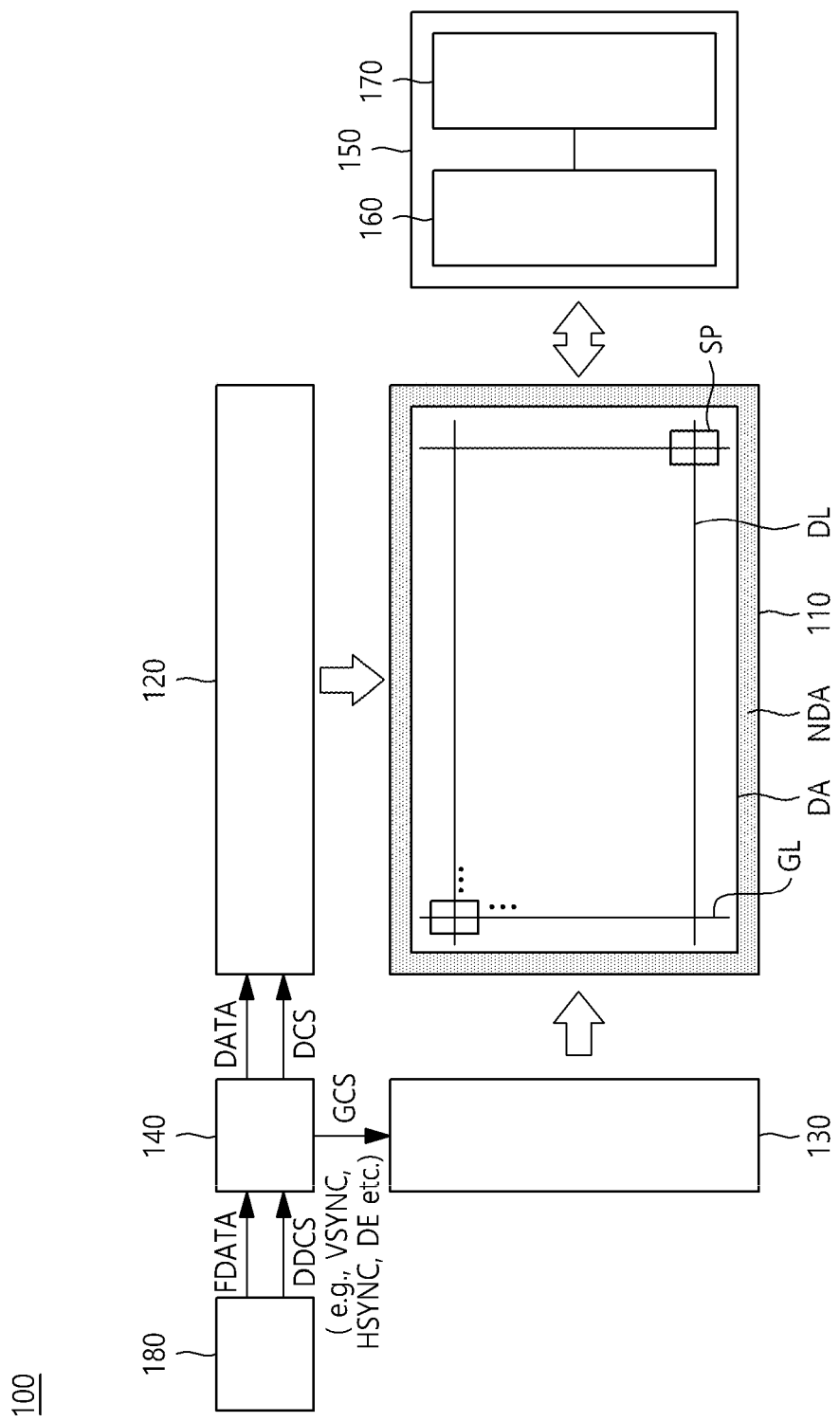
FIG. 1 is a system configuration diagram of a touch display device according to embodiments of the present disclosure.

Hereinafter, embodiments of the disclosure are described in detail with reference to the accompanying drawings. In assigning reference numerals to components of each drawing, the same components may be assigned the same numerals even when they are shown on different drawings. When determined to make the subject matter of the disclosure unclear, the detailed of the known art or functions may be skipped. As used herein, when a component "includes," "has," or "is composed of" another component, the component may add other components unless the component "only" includes, has, or is composed of" the other component. As used herein, the singular forms "a," "an" and "the" are intended to include the plural forms as well, unless the context clearly indicates otherwise.

Such denotations as "first," "second," "A," "B," "(a)," and "(b)," may be used in describing the components of the disclosure. These denotations are provided merely to distinguish a component from another, and the essence, order, or number of the components are not limited by the denotations.

In describing the positional relationship between components, when two or more components are described as "connected," "coupled" or "linked," the two or more components may be directly "connected," "coupled" or "linked," or another component may intervene. Here, the other component may be included in one or more of the two or more components that are "connected," "coupled" or "linked" to each other.

When such terms as, e.g., "after," "next to," "after," and "before," are used to describe the temporal flow relationship related to components, operation methods, and fabricating methods, it may include a non-continuous relationship unless the term "immediately" or "directly" is used.

When a component is designated with a value or its corresponding information (e.g., level), the value or the corresponding information may be interpreted as including a tolerance that may arise due to various factors (e.g., process factors, internal or external impacts, or noise).

Hereinafter, various embodiments of the disclosure are described in detail with reference to the accompanying drawings.

FIG. 1 is a system configuration diagram of a display device 100 according to embodiments of the present disclosure.

Referring to FIG. 1, a touch display device 100 may include a display panel 110 and a display driving circuit as components for displaying an image.

The display driving circuit may be a circuit for driving display driving components included in the display panel 110 so that an image is displayed on the display panel 110, and may include a data driving circuit 120, a gate driving circuit 130, and a display controller 140.

The display panel 110 may include an display area DA where an image is displayed, and may further include a non-display area NDA where an image is not displayed. Here, the non-display area may also be referred to as a bezel area. All or part of the non-display area NDA may be an area visible from the front of the touch display device 100, or may be an area that is bent and not visible from the front of the touch display device 100.

The display panel 110 may include a plurality of subpixels SP, and various types of signal lines to drive the plurality of subpixels SP.

Various types of signal lines may include a plurality of data lines DL transmitting data signals (also referred to as data voltages or image signals) and a plurality of gate lines GL transmitting gate signals (also referred to as scan signals).

The plurality of data lines DL and the plurality of gate lines GL may intersect each other. Each of the plurality of gate lines GL may be disposed to extend in a first direction. Each of the plurality of data lines DL may be disposed to extend in a second direction. Here, the first direction may be a row direction and the second direction may be a column direction. Alternatively or additionally, the first direction may be a column direction and the second direction may be a row direction.

The data driving circuit 120 may be a circuit for driving the data lines, and may output data signals to the data lines DL. The gate driving circuit 130 may be a circuit for driving the gate lines, and may output gate signals to the gate lines GL.

The display controller 140 may receive input data FDATA and a display driving control signal DDCS from a host system 180. For example, the display driving control signal DDCS may include a vertical synchronization signal VSYNC, a horizontal synchronization signal HSYNC, and a data enable signal DE.

The display controller 140 may supply image data DATA to the data driving circuit 120 based on the input data FDATA. In addition, the display controller 140 may be a device for controlling the data driving circuit 120 and the gate driving circuit 130, and may control the driving timing for a plurality of data lines DL and the driving timing for a plurality of gate lines GL. The display controller 140 may supply a data driving control signal DCS to the data driving circuit 120 to control the data driving circuit 120, and may supply a gate driving control signal GCS to the gate driving circuit 130 to control the gate driving circuit 130.

The data driving circuit 120 may supply data signals to a plurality of data lines DL according to the driving timing control of the display controller 140. The data driving circuit 120 may receive image data DATA in digital form from the display controller 140, convert the received image data DATA into data signals in analog form, and output the converted signals to the plurality of data lines DL.

The gate driving circuit 130 may supply gate signals to a plurality of gate lines GL according to the timing control of the display controller 140. The gate driving circuit 130 may receive a first gate voltage corresponding to a turn-on level voltage and a second gate voltage corresponding to a turn-off level voltage together with various gate driving control signals GCS, generate gate signals, and supply the generated gate signals to a plurality of gate lines GL. For example, the first gate voltage may be a higher voltage than the second gate voltage. Alternatively or additionally, the second gate voltage may be a higher voltage than the first gate voltage.

For example, the data driving circuit 120 may be connected to the display panel 110 by a tape automated bonding (TAB) method, or may be connected to a bonding pad of the display panel 110 by a chip-on-glass (COG) or chip-on-panel (COP) method, or may be connected to the display panel 110 by being implemented as a chip-on-film (COF) method. Hereinafter, for convenience of explanation, it is assumed that the data driving circuit 120 is connected to the display panel 110 as a chip-on-film (COF) type.

The gate driving circuit 130 may be connected to the display panel 110 using a tape automated bonding (TAB) method, or may be connected to a bonding pad of the display panel 110 using a chip-on-glass (COG) or chip-on-panel (COP) method, or may be connected to the display panel 110 according to a chip-on-film (COF) method. Alternatively or additionally, the gate driving circuit 130 may be a gate-in-panel (GIP) type, and may be formed in the non-display area NDA of the display panel 110. The gate driving circuit 130 may be disposed on or connected to a substrate. That is, the gate driving circuit 130 may be disposed in a non-display area NDA of the substrate if it is a GIP type. The gate driving circuit 130 may be connected to the substrate if it is a chip-on-glass (COG) type, a chip-on-film (COF) type, or the like.

Meanwhile, at least one of the data driving circuit 120 and the gate driving circuit 130 may be disposed in the display area DA. For example, the gate driving circuit 130 may be disposed in the display area DA. In this case, the gate driving circuit 130 may be disposed so as not to overlap with the subpixels SP, or may be disposed so as to partially or completely overlap with the subpixels SP.

Depending on the driving method, panel design method, or panel shape, the data driving circuit 120 may be connected to one side of the display panel 110, may be connected to one side and the other side of the display panel 110, or may be connected along the side of the display panel 110.

Depending on the driving method, panel design method, or panel shape, the gate driving circuit 130 may be connected to one side of the display panel 110, may be connected to one side and the other side of the display panel 110, or may be connected along the side of the display panel 110.

The display controller 140 may be implemented as a separate component from the data driving circuit 120, or may be implemented as an integrated circuit integrated with the data driving circuit 120.

The display controller 140 may be a timing controller used in typical display technology, or may be a control device capable of further performing other control functions including a timing controller, or may be a control device different from the timing controller, or may be a circuit within the control device. The display controller 140 may be implemented with various circuits or electronic components, such as an integrated circuit (IC), a field programmable gate array (FPGA), an application specific integrated circuit (ASIC), or a processor.

The display controller 140 may be mounted on a printed circuit board, a flexible printed circuit, etc., and may be electrically connected to the data driving circuit 120 and the gate driving circuit 130 through a printed circuit board, a flexible printed circuit.

The display controller 140 may transmit and receive signals with the data driving circuit 120 according to one or more predetermined interfaces. For example, the interface may include a low voltage differential signaling (LVDS) interface, an embedded clock point-point interface (EPI), or a serial peripheral interface (SPI).

Meanwhile, in order to provide a touch sensing function in addition to an image display function, the touch display device 100 according to the embodiments of the present disclosure may include a touch sensor and a touch sensing circuit 150.

The touch sensing circuit 150 may detect whether a touch has occurred by a touch object such as a finger or pen by sensing the touch sensor, or detects a touch location.

The touch sensing circuit 150 may include a touch driving circuit 160 for driving and sensing the touch sensor to generate touch sensing data, and a touch controller 170 capable of detecting touch occurrence or a touch location using the touch sensing data.

The touch sensor may include a plurality of touch electrodes. The plurality of touch electrodes may be electrically connected to the touch driving circuit 160 through a plurality of touch lines. The touch sensor is described in more detail with reference to FIGS. 2 and 3.

The touch driving circuit 160 and the touch controller 170 included in the touch sensing circuit 150 may be implemented as separate devices or as one device. In addition, the touch driving circuit 160 and the data driving circuit 120 may be implemented as separate devices or as one device.

For example, the touch driving circuit 160 may be implemented as a readout integrated circuit (ROIC). Alternatively or additionally, the touch driving circuit 160 and the data driving circuit 120 may be integrated and implemented as a source and readout integrated circuit (SRIC). The touch controller 170 may be implemented as a micro control unit (MCU).

The touch display device 100 may further include a power supply circuit which supplies various types of power to the display driving circuit and/or the touch sensing circuit.

The touch display device 100 according to the embodiments of the present disclosure may be a display device in which the display panel 110 cannot emit light by itself, such as a liquid crystal display device, or may be a self-luminous display device in which the display panel 110 can emit light by itself. For example, the touch display device 100 according to the embodiments of the present disclosure may be one of an organic light emitting diode (OLED) display device, a quantum dot display device, a light emitting diode (LED) display device, etc.

If the touch display device 100 according to the embodiments of the present disclosure is an organic light emitting diode display device, each subpixel SP may include an organic light emitting diode (OLED) which emits light by itself as a light emitting device. If the touch display device 100 according to the embodiments of the present disclosure is a quantum dot display device, each subpixel SP may include a light emitting device made of a quantum dot, which is a semiconductor crystal emitting light by itself. If the touch display device 100 according to the embodiments of the present disclosure is a light emitting diode display device, each subpixel SP may include a light emitting diode (also referred to as a light emitting diode chip) emitting light by itself using an inorganic semiconductor compound as a light emitting device. For example, the light emitting diode (LED) may be a micro light emitting diode (also referred to as a micro light emitting diode chip) or a nano light emitting diode (also referred to as a nano light emitting diode chip). Such a light emitting diode (LED) may have a length/width in micrometer units or nanometer units.

The touch display device 100 according to the embodiments of the present disclosure may be a mobile terminal such as a smart phone or a tablet, or a monitor or television (TV) of various sizes, and is not limited thereto, and may be a display of various types and sizes capable of displaying information or images.

Alternatively or additionally, the touch display device 100 according to embodiments of the present disclosure may be a wearable device which may be worn on the body, such as a smart watch.

Figure 2:
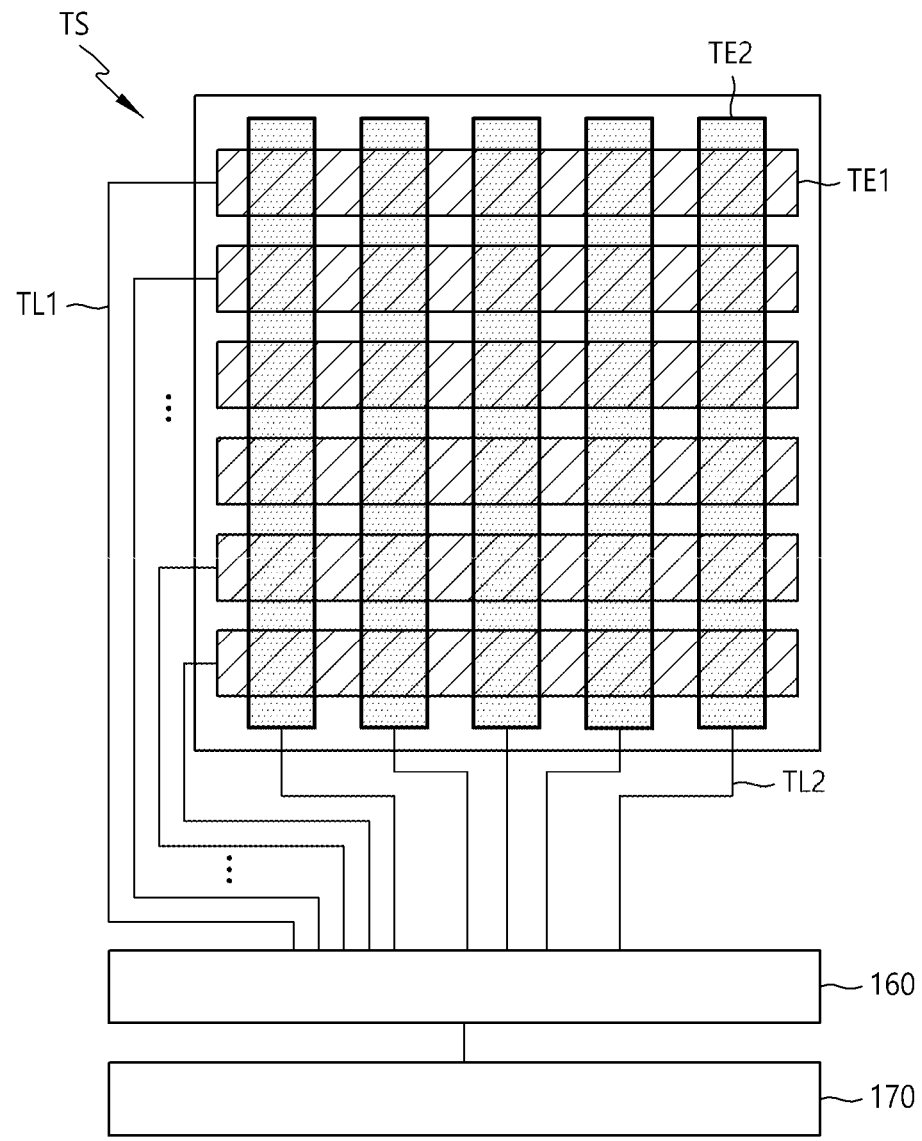
FIG. 2 illustrates a touch sensor structure of a touch display device according to embodiments of the present disclosure.

FIG. 2 illustrates a touch sensor structure of a touch display device 100 according to embodiments of the present disclosure.

Referring to FIG. 2, the touch driving circuit 160 may sense a touch sensor TS and generate touch sensing data as a sensing result and provide the touch sensing data to the touch controller 170.

Referring to FIG. 2, the touch sensor TS may include a plurality of touch electrodes TE. The plurality of touch electrodes TE may be electrically connected to the touch driving circuit 160 through a plurality of touch lines TL.

Referring to FIG. 2, the plurality of touch electrodes TE may include a plurality of first touch electrodes TE1 and a plurality of second touch electrodes TE2. For example, the plurality of first touch electrodes TE1 and the plurality of second touch electrodes TE2 may intersect each other. Each of the plurality of first touch electrodes TE1 may extend in a first direction, and each of the plurality of second touch electrodes TE2 may extend in a second direction. Accordingly, a portion of each of the plurality of first touch electrodes TE1 may overlap with the plurality of second touch electrodes TE2.

Referring to FIG. 2, the plurality of first touch electrodes TE1 may be electrically connected to the touch driving circuit 160 through a plurality of first touch lines TL1, respectively, and the plurality of second touch electrodes TE2 may be electrically connected to the touch driving circuit 160 through a plurality of second touch lines TL2, respectively.

The touch sensor TS may be implemented as a touch panel, and may exist separately on the outside of the display panel 110 or may exist inside the display panel 110.

An external touch sensor TS existing on the outside of the display panel 110 may be manufactured separately from the display panel 110, and then combined with the display panel 110 during the assembly process. The external touch sensor TS may be implemented as a touch panel including a substrate and a plurality of touch electrodes TE on the substrate.

An internal or built-in touch sensor TS existing in the display panel 110 may be formed together with the electrodes and lines related to display driving during the manufacturing process of the display panel 110. Hereinafter, for convenience of explanation, it is assumed that the touch sensor TS is an built-in touch sensor or an internal touch sensor TS present inside the display panel 110.

The touch driving circuit 160 may supply a touch driving signal to at least one of the plurality of touch electrodes TE included in the touch sensor TS, and may sense at least one of the plurality of touch electrodes TE to generate touch sensing data. Here, the touch driving signal may be a signal whose voltage level changes.

The touch sensing circuit 150 may sense a touch using a mutual-capacitance sensing method or a self-capacitance sensing method.

In the case that the touch sensing circuit 150 performs touch sensing in a mutual-capacitance sensing method, the touch sensing circuit 150 may perform touch sensing based on the capacitance between the first touch electrode TE1 and the second touch electrode TE2.

According to the mutual-capacitance sensing method, the plurality of touch electrodes TE may be divided into a driving touch electrode (also referred to as a transmitting touch electrode) and a sensing touch electrode (also referred to as a receiving touch electrode). The touch driving circuit 160 may drive the driving touch electrodes and sense the sensing touch electrodes. Hereinafter, mutual-capacitance sensing may also be described as "mutual-sensing."

For example, in mutual-sensing, the plurality of first touch electrodes TE1 may be driving touch electrodes (e.g., transmitting touch electrodes) and the plurality of second touch electrodes TE2 may be sensing touch electrodes (e.g., receiving touch electrodes). For another example, in mutual-sensing, the plurality of first touch electrodes TE1 may be sensing touch electrodes (e.g., receiving touch electrodes) and the plurality of second touch electrodes TE2 may be driving touch electrodes (e.g., transmitting touch electrodes). Hereinafter, for convenience of explanation, there is exemplified a case in which the plurality of first touch electrodes TE1 are the driving touch electrodes (e.g., transmitting touch electrodes) and the plurality of second touch electrodes TE2 are the sensing touch electrodes (e.g., receiving touch electrodes).

In the case that the touch sensing circuit 150 performs touch sensing in a self-capacitance sensing method, the touch sensing circuit 150 may perform touch sensing based on the capacitance between each touch electrode TE and a touch object (e.g., a finger, a pen, etc.).

According to the self-capacitance sensing method, each of the plurality of touch electrodes TE may serve as a driving touch electrode and a sensing touch electrode. The touch driving circuit 160 may drive all or part of the plurality of touch electrodes TE and sense all or part of the plurality of touch electrodes TE. Hereinafter, self-capacitance sensing may also be referred to as "self-sensing."

For example, in self-sensing, the touch driving circuit 160 may supply (apply) a touch driving signal to at least one first touch electrode TE1 among the plurality of first touch electrodes TE1, and sense at least one first touch electrode TE1 supplied with the touch driving signal. The touch driving circuit 160 may supply a touch driving signal to at least one second touch electrode TE2 among the plurality of second touch electrodes TE2, and sense at least one second touch electrode TE2 to which the touch driving signal is supplied.

Referring to FIG. 2, one first touch line TL1 may be connected to each of the plurality of first touch electrodes TE1. Alternatively or additionally, two first touch lines TL1 may be connected to each of the plurality of first touch electrodes TE1. In this case, a first touch line TL1 may be connected to each of one end and the other end of one first touch electrode TE1.

One second touch line TL2 may be connected to each of the plurality of second touch electrodes TE2. Alternatively or additionally, two second touch lines TL2 may be connected to each of the plurality of second touch electrodes TE2. In this case, a second touch line TL2 may be connected to each of one end and the other end of one second touch electrode TE2.

As an example, each of the plurality of first touch electrodes TE1 and the plurality of second touch electrodes TE2 may have a bar shape.

As another example, each of the plurality of first touch electrodes TE1 and the plurality of second touch electrodes TE2 may be configured as a plurality of sub-electrodes which are electrically connected to each other through a bridge electrode.

As another example, each of the plurality of first touch electrodes TE1 may be formed integrally, and each of the plurality of second touch electrodes TE2 may be formed of a plurality of sub-electrodes electrically connected to each other by bridge electrodes.

As another example, each of the plurality of second touch electrodes TE2 may be formed integrally, and each of the plurality of first touch electrodes TE1 may be formed of a plurality of sub-electrodes electrically connected to each other by bridge electrodes.

As an example, the plurality of first touch electrodes TE1 may be disposed in a first sensor metal layer, and the plurality of second touch electrodes TE2 may be disposed in a second sensor metal layer. Here, a sensor interlayer insulating film may be disposed between the first sensor metal layer and the second sensor metal layer.

In another example, if each of the plurality of first touch electrodes TE1 is formed integrally and each of the plurality of second touch electrodes TE2 is formed of a plurality of sub-electrodes electrically connected to each other by bridge electrodes, the plurality of first touch electrodes TE1 and the plurality of sub-electrodes may be disposed within a sensor metal layer, and the bridge electrodes electrically connecting the plurality of sub-electrodes may be disposed within a bridge metal layer. Here, a sensor interlayer insulating film may be disposed between the sensor metal layer and the bridge metal layer.

In another example, if each of the plurality of second touch electrodes TE2 is formed integrally and each of the plurality of first touch electrodes TE1 is formed of a plurality of sub-electrodes electrically connected to each other by bridge electrodes, the plurality of second touch electrodes TE2 and the plurality of sub-electrodes may be disposed within a sensor metal layer, and the bridge electrodes electrically connecting the plurality of sub-electrodes may be disposed within a bridge metal layer. Here, a sensor interlayer insulating film may be arranged between the sensor metal layer and the bridge metal layer Referring to FIG. 2, in the touch display device 100 according to the embodiments of the present disclosure, each of the plurality of touch electrodes TE may correspond to the size of two or more subpixels SP.

For example, each of the plurality of touch electrodes TE may be a mesh-type electrode having two or more openings, and may overlap with two or more subpixels SP. The two or more openings may overlap with the light emission areas of the two or more subpixels SP. That is, light emitted from the two or more subpixels SP may be emitted toward the front side of the display panel 110 through the two or more openings.

Figure 3:
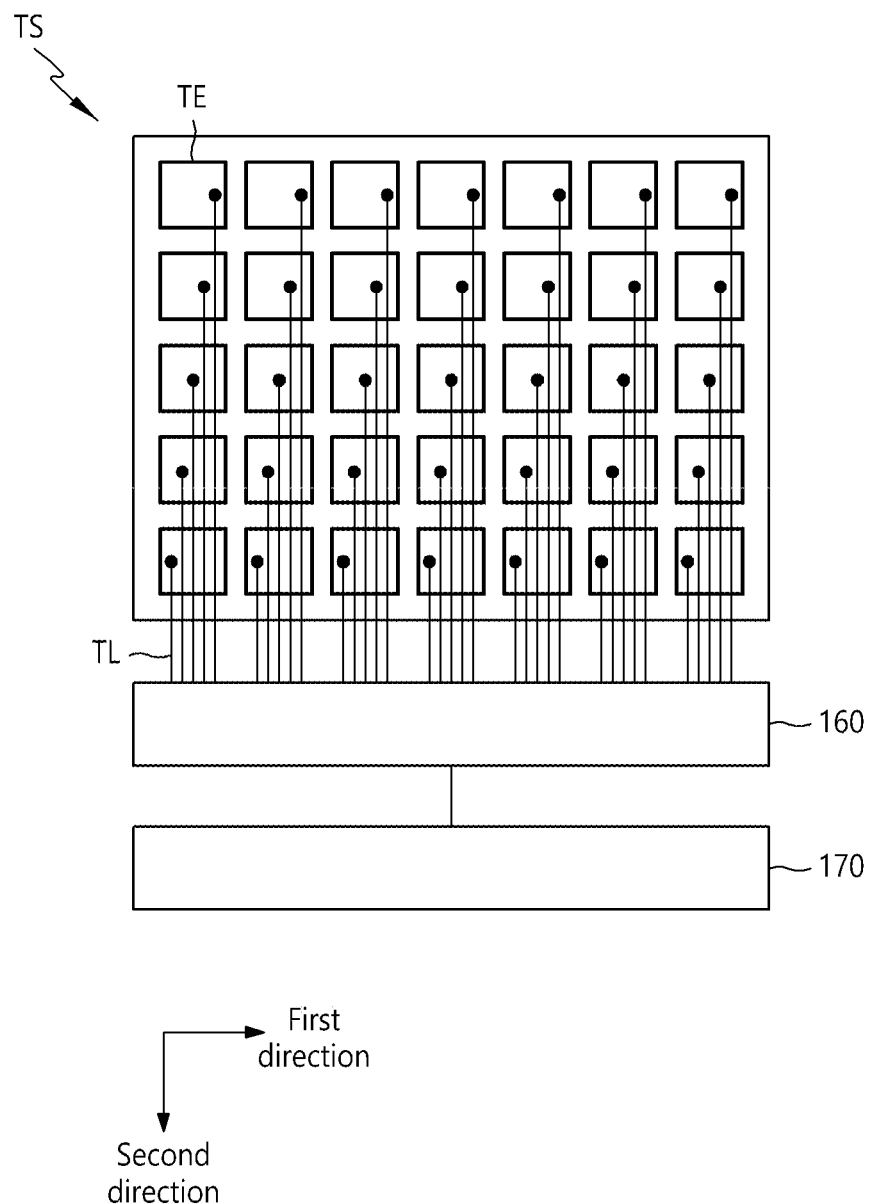
FIG. 3 illustrates another touch sensor structure of a touch display device according to embodiments of the present disclosure.

FIG. 3 illustrates another touch sensor structure of a touch display device 100 according to embodiments of the present disclosure.

Referring to FIG. 3, another touch sensor structure of a touch display device 100 according to embodiments of the present disclosure may include a plurality of touch electrodes TE which do not overlap with each other.

Referring to FIG. 3, another touch sensor structure of a touch display device 100 according to embodiments of the present disclosure may further include a plurality of touch lines TL for electrically connecting a plurality of touch electrodes TE to a touch driving circuit 160.

Referring to FIG. 3, each of the plurality of touch lines TL may overlap with at least one touch electrode TE. For example, one touch line TL may overlap with an electrically connected touch electrode TE, and may also overlap with at least one non-electrically connected touch electrode TE.

Referring to FIG. 3, in the touch display device 100 according to the embodiments of the present disclosure, each of the plurality of touch electrodes TE may correspond to the size of at least one subpixel SP.

For example, each of the plurality of touch electrodes TE may be a mesh-type electrode having at least one opening, and may overlap with at least one subpixel SP. At least one opening may overlap with the light emission area of at least one subpixel SP. That is, light emitted from at least one subpixel SP may be emitted toward the front side of the display panel 110 through at least one opening.

Referring to FIG. 3, during self-sensing, the touch driving circuit 160 may supply a touch driving signal to at least one of a plurality of touch electrodes TE, and may sense at least one touch electrode TE to which the touch driving signal is supplied.

Hereinafter, for convenience of explanation, in describing a touch display device 100 according to embodiments of the present disclosure, the touch sensor structure of FIG. 2 will be described as an example.

Figure 4:
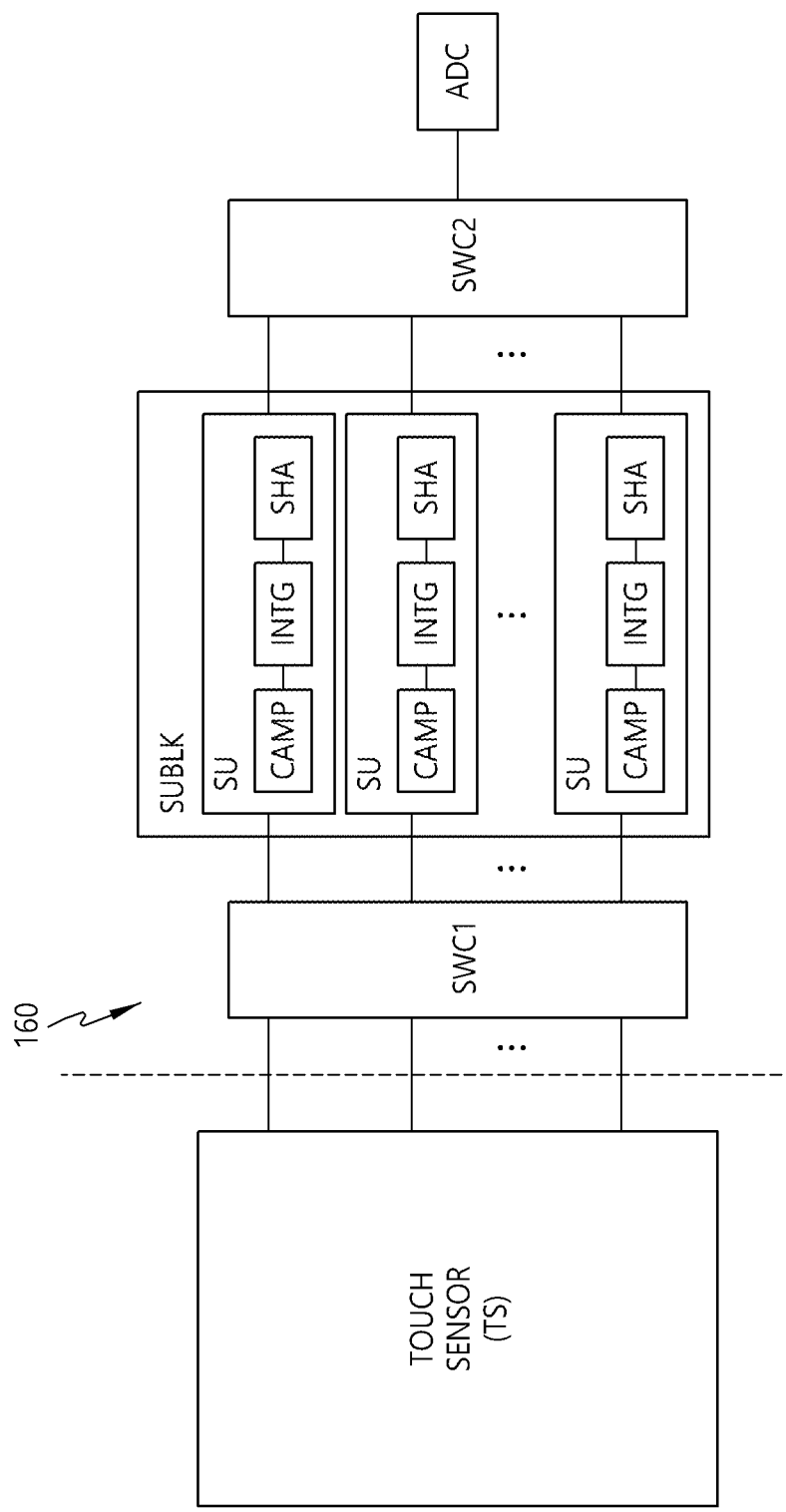
FIG. 4 illustrates a touch driving circuit according to embodiments of the present disclosure.
Figure 5:
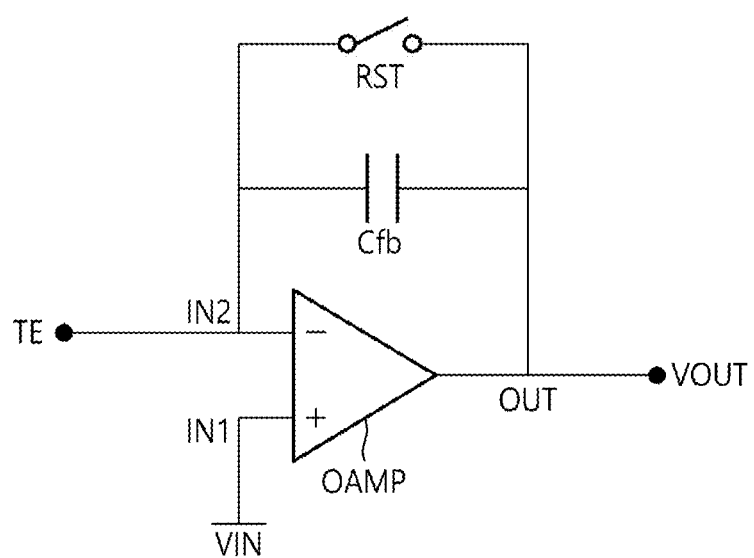
FIG. 5 illustrates a charge amplifier in a touch driving circuit according to embodiments of the present disclosure.

FIG. 4 illustrates a touch driving circuit 160 according to embodiments of the present disclosure. FIG. 5 illustrates a charge amplifier CAMP in the touch driving circuit 160 according to embodiments of the present disclosure.

Referring to FIG. 4, the touch driving circuit 160 according to embodiments of the present disclosure may include a sensing unit block SUBLK for sensing a touch sensor TS. The sensing unit block SUBLK may include a plurality of sensing units SU.

Referring to FIG. 4, the touch driving circuit 160 according to the embodiments of the present disclosure may further include a first selection circuit SWC1, a second selection circuit SWC2, and an analog-to-digital converter ADC.

Referring to FIG. 4, the first selection circuit SWC1 may connect the touch electrodes TE to be sensed among the plurality of touch electrodes TE included in the touch sensor TS to the sensing unit block SUBLK. The first selection circuit SWC1 may include a plurality of switches and may also be referred to as a multiplexer circuit.

Referring to FIG. 4, the second selection circuit SWC2 may connect one of the plurality of sensing units SU included in the sensing unit block SUBLK to the analog-to-digital converter ADC. The second selection circuit SWC2 may include a plurality of switches and may also be referred to as a multiplexer circuit.

Referring to FIG. 4, each of the plurality of sensing units SU may include a charge amplifier CAMP, an integrator INTG, and a sample and hold circuit SHA.

Referring to FIG. 4, the charge amplifier CAMP may be electrically connected to one or more touch electrodes TE selected by the first selection circuit SWC1 among the plurality of touch electrodes TE included in the touch sensor TS.

Referring to FIG. 4, the first selection circuit SWC1 may connect a touch electrode TE, which is a sensing target, among the plurality of touch electrodes TE to a charge amplifier CAMP in a corresponding sensing unit SU among the plurality of sensing units SU.

Accordingly, the charge amplifier CAMP in the sensing unit SU may receive a touch sensing signal from a touch electrode TE selected as a sensing target among a plurality of touch electrodes TE. That is, the charge amplifier CAMP in the sensing unit SU may detect a touch sensing signal from a touch electrode TE that is a sensing target. Here, the touch sensing signal detected by the touch electrode TE may correspond to a capacitance (e.g., mutual capacitance or self capacitance) related to the touch electrode TE.

Referring to FIGS. 4 and 5, the charge amplifier CAMP may output an output signal VOUT corresponding to the touch sensing signal detected by the touch electrode TE.

Referring to FIG. 5, the charge amplifier CAMP may include an operational amplifier OAMP including a first input node IN1, a second input node IN2, and an output node OUT, and a feedback capacitor Cfb between the second input node IN2 and the output node OUT.

Referring to FIG. 5, the first input node IN1 may be a node into which an input signal VIN is input. The second input node IN2 may be a node electrically connected to a touch electrode TE selected by a first selection circuit SWC1. The output node OUT may be a node connected to an integrator INTG and may be a node outputting an output signal VOUT.

Referring to FIG. 5, a charge corresponding to a capacitance (e.g., self capacitance or mutual capacitance) in a touch electrode TE may be charged in a feedback capacitor Cfb, and there may be output an output signal VOUT corresponding to the amount of charge charged in the feedback capacitor Cfb. Here, a configuration in which the touch driving circuit 160 detects a touch sensing signal from the touch electrode TE may mean detecting the capacitance (e.g., self capacitance or mutual capacitance) of the touch electrode TE, charging an amount of charge corresponding to the capacitance (e.g., self capacitance or mutual capacitance) of the touch electrode TE in the feedback capacitor Cfb, and outputting an output signal VOUT corresponding to the amount of charge charged.

Referring to FIG. 5, the charge amplifier CAMP may further include a reset switch RST which controls the connection between the second input node IN2 and the output node OUT.

Referring to FIG. 5, the integrator INTG may output an integral value integrating the output signal VOUT of the charge amplifier CAMP. Here, the charge amplifier CAMP and the integrator INTG may be implemented in an integrated method.

The sample and hold circuit SHA may store the integral value output from the integrator INTG until the next integral value is output from the integrator INTG.

The second selection circuit SWC2 may connect one of the plurality of sensing units SU included in the sensing unit block SUBLK to an analog-to-digital converter ADC.

The analog-to-digital converter ADC may convert the integral value stored in the sample and hold circuit SHA in the sensing unit SU selected by the second selection circuit SWC2 into a digital value to generate touch sensing data.

The touch driving circuit 160 may transmit the touch sensing data generated by the analog-to-digital converter ADC to the touch controller 170. In this case, the touch sensing data may be transmitted in the form of a differential signal.

Meanwhile, referring to FIG. 5, the input signal VIN input to the first input node IN1 of the charge amplifier CAMP may be a signal whose voltage level does not fluctuate or swing, or may be a signal whose voltage level fluctuates or swings.

The type of the input signal VIN may vary depending on the sensing method.

If touch sensing is performed in a mutual-sensing method, the input signal VIN may be a reference voltage whose voltage level does not fluctuate or swing.

If touch sensing is performed in a self-sensing method, the input signal VIN may be a touch driving signal whose voltage level fluctuates or swings.

The touch electrode TE electrically connected to the second input node N2 may vary depending on the sensing method.

Referring to FIG. 2 and FIG. 5, if touch sensing is performed in a mutual-sensing method, the second input node N2 may be electrically connected to one of the plurality of second touch electrodes TE2.

Referring to FIG. 3 and FIG. 5, if touch sensing is performed in a self-sensing method, the second input node N2 may be electrically connected to one of the plurality of touch electrodes TE.

Meanwhile, the touch display device 100 according to the embodiments of the present disclosure may not only sense a contact-type touch, but also sense a non-contact-type touch. Hereinafter, it will be described various touch sensing modes of the touch display device 100 according to the embodiments of the present disclosure.

Figure 6:
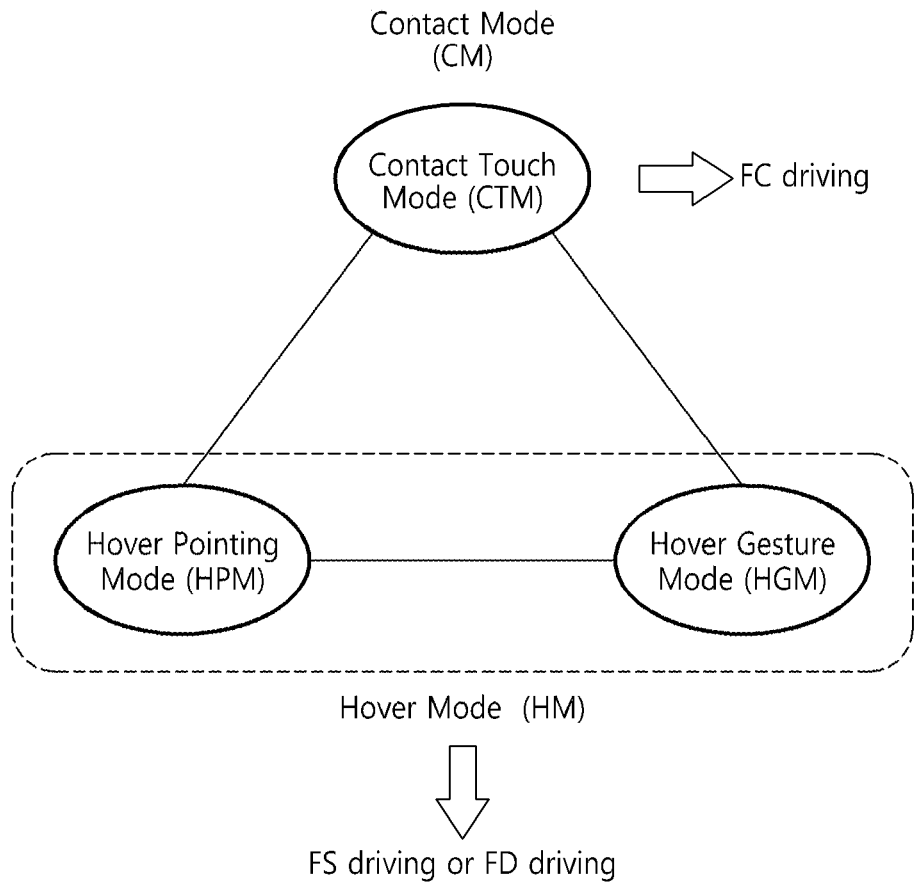
FIG. 6 illustrates an operating mode of a touch display device according to embodiments of the present disclosure.

FIG. 6 illustrates operating modes of a touch display device 100 according to embodiments of the present disclosure.

Referring to FIG. 6, the touch display device 100 according to the embodiments of the present disclosure may sense not only a contact-type touch, but also a non-contact-type touch.

A contact-type touch may mean a touch in which a user directly contacts a screen with a touch pointer, and may be also referred to as a "contact touch".

A non-contact-type touch may mean an action of pointing to a point on the screen with a touch pointer or moving the touch pointer without the user directly contacting the screen with the touch pointer, and may be also referred to as a "non-contact touch".

The non-contact touch may include a "non-contact pointing touch" in which a user points to a point on the screen with a touch pointer which is away from the screen, and a "non-contact gesture" in which a user moves a touch pointer which is away from the screen.

In the touch display device 100 according to the embodiments of the present disclosure, the user's touch pointer may be a human body such as a finger, and in some cases, may be a touch tool such as a pen.

Referring to FIG. 6, the plurality of operating modes of the touch display device 100 according to the embodiments of the present disclosure may include a contact mode CM and a hover mode HM.

Referring to FIG. 6, the contact mode CM may be an operating mode (or operating period) for sensing a contact touch, and may include a display mode (or display driving period) for driving a display and a touch sensing mode (or touch sensing period) for sensing a contact touch.

If the operating mode is the contact mode CM, the touch sensing mode for sensing a contact touch may be referred to as a contact touch mode CTM.

Referring to FIG. 6, the hover mode HM may be an operating mode for sensing a non-contact touch (also referred to as a hover touch), and may include a display mode for driving a display and a touch sensing mode for sensing a non-contact touch (also referred to as a hover touch).

If the operating mode is the hover mode HM, the touch sensing mode for sensing a non-contact touch may include a hover pointing mode HPM and a hover gesture mode HGM.

The hover pointing mode HPM may be a touch sensing mode for sensing a non-contact pointing touch among non-contact touches. Here, the hover pointing mode HPM may also be referred to as a hover finger mode.

The hover gesture mode HGM may be a touch sensing mode for sensing a non-contact gesture among non-contact touches.

Referring to FIG. 6, the touch display device 100 according to the embodiments of the present disclosure may provide two or more of three driving methods. The three driving methods may include a frame contact FC driving method, a frame single FS driving method, and a frame double FD driving method.

For example, the touch display device 100 according to the embodiments of the present disclosure may provide two driving methods including a frame contact FC driving method and a frame single FS driving method.

For another example, the touch display device 100 according to the embodiments of the present disclosure may provide two driving methods including a frame contact FC driving method and a frame double FD driving method.

For another example, the touch display device 100 according to the embodiments of the present disclosure may drive the display panel 110 in three driving methods including a frame contact FC driving method, a frame single FS driving method, and a frame double FD driving method.

Referring to FIG. 6, if the operating mode of the touch display device 100 is a contact mode CM to perform display driving and contact touch sensing, the touch display device 100 may drive the display panel 110 in a frame contact FC driving method.

Referring to FIG. 6, if the operating mode of the touch display device 100 is a hover mode for performing display driving and non-contact touch sensing, the touch display device 100 may drive the display panel 110 in a frame single FS driving method or a frame double FD driving method.

Figure 7:
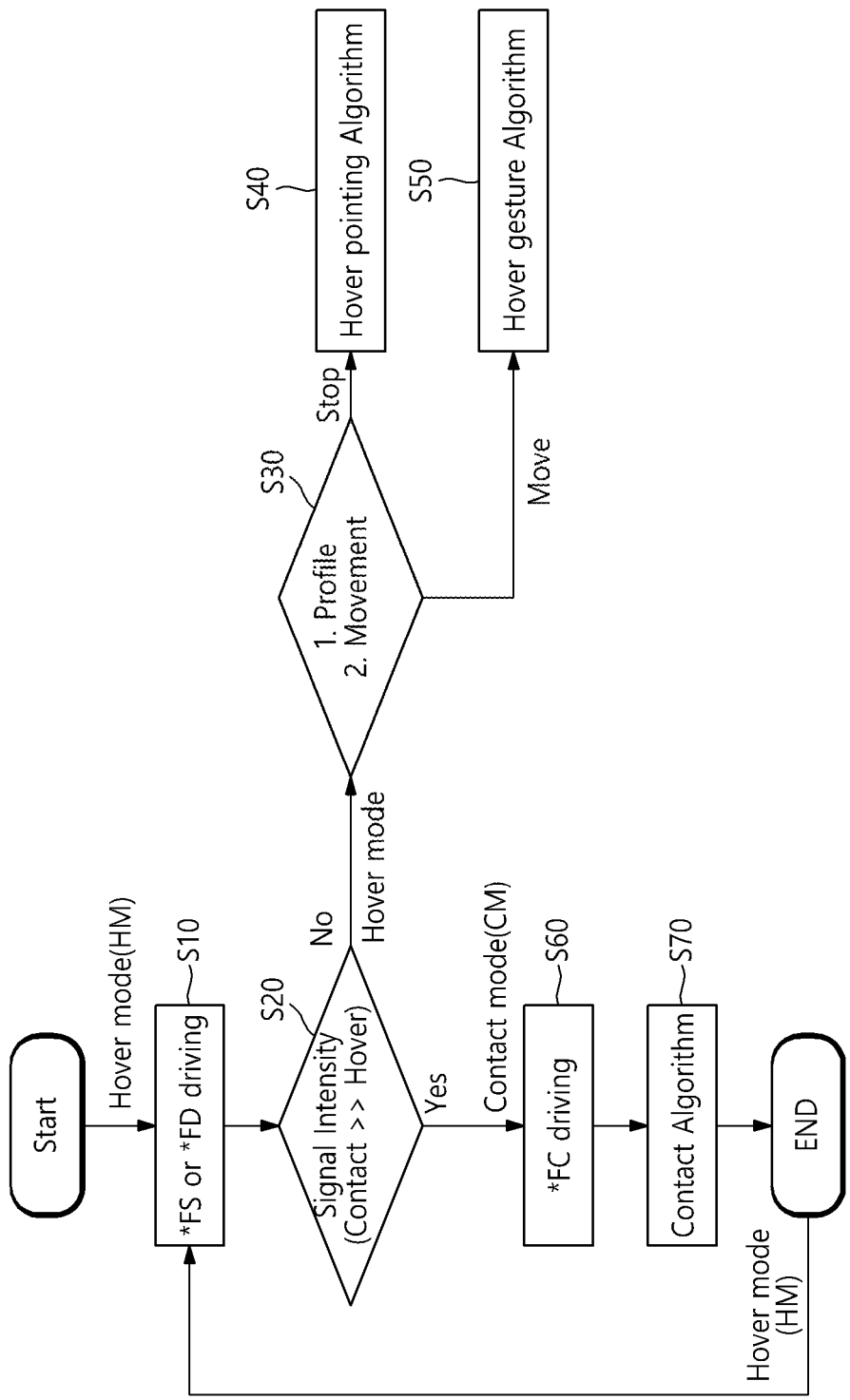
FIG. 7 illustrates an operation flowchart of a touch display device according to embodiments of the present disclosure.

FIG. 7 illustrates an operation flowchart of a touch display device 100 according to embodiments of the present disclosure.

Referring to FIG. 7, the touch display device 100 according to the embodiments of the present disclosure may drive the display panel 110 in a frame single FS driving method or a frame double FD driving method if the operating mode is a hover mode HM (S10).

Referring to FIG. 7, the touch display device 100 according to the embodiments of the present disclosure may determine an intensity of a sensing signal sensed from a touch sensor TS while driving the display panel 110 in a frame single FS driving method or a frame double FD driving method (S20).

Referring to FIG. 7, the touch display device 100 according to the embodiments of the present disclosure may change the operating mode to a contact mode CM and drive the display panel 110 in a frame contact FC driving method if the intensity of the sensing signal is equal to or higher than a predetermined level as a result of the determination in step (S10).

Referring to FIG. 7, the touch display device 100 according to the embodiments of the present disclosure may determine a coordinate for a contact touch by performing a contact algorithm while driving the display panel 110 in a frame contact FC driving method in a state where the operating mode is a contact mode CM (S70).

Referring to FIG. 7, if the intensity of the sensing signal is lower than the predetermined level as a result of the determination in step S10, the touch display device 100 according to the embodiments of the present disclosure may identify characteristics of a non-contact touch based on the sensing signal to distinguish whether the non-contact touch corresponding to the sensing signal is a non-contact pointing touch or a non-contact gesture while maintaining the operating mode as a hover mode HM (S30).

The configuration in which the touch display device 100 identifies characteristics of a non-contact touch based on the sensing signal may mean identifying the presence or absence of a profile or movement characteristic for the sensing signal or the non-contact touch.

Referring to FIG. 7, the touch display device 100 according to the embodiments of the present disclosure may determine a coordinate for a non-contact pointing touch by performing a hover pointing algorithm (S40), or may determine the presence or absence and type of a hover gesture by performing a hover gesture algorithm (S50) based on the result of distinguishing whether a non-contact touch is a non-contact pointing touch or a non-contact gesture in step S30.

That is, referring to FIG. 7, the driving method of the touch display device 100 according to the embodiments of the present disclosure may include a step (S10) of operating in a hover mode HM including a display mode DM, a hover pointing mode HPM, and a hover gesture mode HGM, a step (S20) of determining the intensity of a sensing signal for a touch sensor TS, a step (S60) of operating in a contact mode CM including a display mode DM and a contact touch mode CTM if the intensity of the sensing signal is above a predetermined level, a step (S70) of performing a contact algorithm based on the result of operating in the contact mode CM to determine coordinates for a contact touch, a step (S30) of determining whether there is a movement characteristic based on the sensing signal if the intensity of the sensing signal is below a predetermined level, a step (S40) of determining coordinate for a hover touch while operating in the hover mode HM if there is no movement characteristic based on the sensing signal, and a step (S50) of determining a hover gesture while operating in the hover mode HM if there is a movement characteristic based on the sensing signal.

If the operating mode is the contact mode CM, the touch sensing mode may include a contact touch mode CTM.

If the operating mode is the hover mode HM, the touch sensing mode may include a hover pointing mode HPM and a hover gesture mode HGM.

Depending on whether the touch sensing mode is the contact touch mode CTM, the hover pointing mode HPM, or the hover gesture mode HGM, the amplitude of the touch driving signal applied to the touch sensor TS may vary.

For example, while the contact touch mode CTM is in progress, a first touch driving signal having a first amplitude may be applied to the touch sensor TS. While the hover pointing mode HPM is in progress, a second touch driving signal having a second amplitude different from the first amplitude may be applied to the touch sensor TS. While the hover gesture mode HGM is in progress, a third touch driving signal having a third amplitude different from the first amplitude may be applied to the touch sensor TS.

For example, the second amplitude ΔV2 may be greater than the first amplitude ΔV1. The third amplitude ΔV3 may be greater than or equal to the second amplitude ΔV2.

Meanwhile, while the display mode DM) is in progress, no voltage or signal may be applied to the touch sensor TS, or a direct current (DC) voltage may be applied. For example, the DC voltage may be a reference voltage.

While the display mode DM is in progress, the DC voltage applied to the touch sensor TS may have a value which does not affect a voltage state of the display driving-related electrodes or lines (e.g., pixel electrode or anode electrode, common electrode or cathode electrode, source/drain/gate electrode of various transistors, various signal line, etc.) overlapping with the touch sensor TS.

The operating method or a driving method of the touch display device 100 according to the embodiments of the present disclosure described above may be performed and controlled by the touch driving circuit 160 and the touch controller 170. In addition, in some cases, there may also be a control of the display controller 140.

The contact algorithm, hover pointing algorithm, and hover gesture algorithm executed in the operating method or the driving method of the touch display device 100 according to the embodiments of the present disclosure may be performed by the touch controller 170.

Hereinafter, it will be described an operating method or a driving method of the touch display device 100 according to the embodiments of the present disclosure and the driving circuit therefor in more detail.

Figure 8:
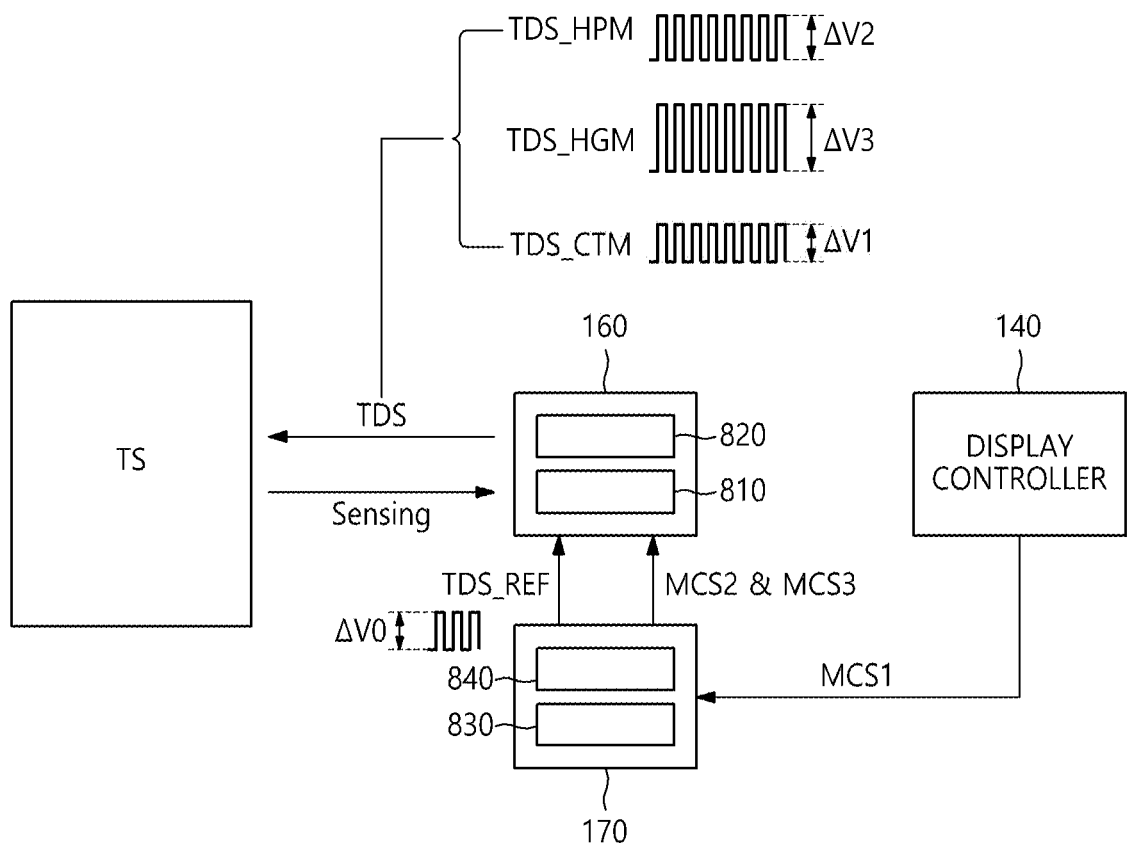
FIG. 8 illustrates a touch sensing system of a touch display device according to embodiments of the present disclosure.

FIG. 8 illustrates a touch sensing system of a touch display device 100 according to embodiments of the present disclosure.

Referring to FIG. 8, the touch sensing system of the touch display device 100 according to the embodiments of the present disclosure may include a touch sensor TS including a plurality of touch electrodes TE and a touch driving circuit 160 for driving the touch sensor TS.

Referring to FIG. 8, the touch sensing system of the touch display device 100 according to the embodiments of the present disclosure may further include a touch controller 170 for determining a coordinate of a user's touch (e.g., contact touch or non-contact pointing touch) or determining a user's gesture (e.g., non-contact gesture) by using sensing data obtained from the driving result (or sensing result) of the touch driving circuit 160.

Referring to FIG. 8, the driving circuit of the touch display device 100 according to the embodiments of the present disclosure may include a touch driving circuit 160, a touch controller 170, and a display controller 140.

Referring to FIG. 8, the touch driving circuit 160 may include a first signal generation unit 810 and a first signal output unit 820.

Referring to FIG. 8, the first signal generation unit 810 may generate a touch driving signal TDS to be applied to at least one touch electrode TE among a plurality of touch electrodes TE based on a reference touch driving signal TDS_REF according to a touch sensing mode selected from among a plurality of touch sensing modes.

Referring to FIG. 8, the first signal output unit 820 may output the touch driving signal TDS generated by the first signal generation unit 810 to at least one touch electrode TE.

Referring to FIG. 8, a plurality of operating modes of the touch display device 100 or the driving circuit of the touch display device 100 may include a contact mode CM for sensing a contact touch and a hover mode HM for sensing a non-contact touch.

The contact mode CM may include a display mode DM for displaying an image and a contact touch mode CTM for sensing a contact touch.

The hover mode HM may include a display mode DM, a hover pointing mode HPM for sensing a non-contact pointing touch which points to a point on a screen among non-contact touches, and a hover gesture mode HGM for sensing a non-contact gesture with movement among non-contact touches.

Referring to FIG. 8, the plurality of touch sensing modes may include a contact touch mode CTM, a hover pointing mode HPM, and a hover gesture mode HGM.

Referring to FIG. 8, the first signal generation unit 810 may generate a touch driving signal TDS corresponding to a touch sensing mode of the touch sensing modes among the contact touch mode CTM, the hover pointing mode HPM and the hover gesture mode HGM according to a first mode control signal MCS1, a second mode control signal MCS2, and a third mode control signal MCS3 having different signal waveforms.

In the contact touch mode CTM, a first touch driving signal TDS_CTM having a first amplitude $\Delta V1$ may be applied to the touch sensor TS by the touch driving circuit 160. That is, if the contact touch mode CTM is selected as the touch sensing mode, the touch driving signal TDS may be a first touch driving signal TDS_CTM having a first amplitude $\Delta V1$.

In the hover pointing mode HPM), a second touch driving signal TDS_HPM having a second amplitude $\Delta V2$ different from the first amplitude $\Delta V1$ may be applied to the touch sensor TS by the touch driving circuit 160. That is, if the hover pointing mode HPM is selected as the touch sensing mode, the touch driving signal TDS may be a second touch driving signal TDS_HPM having a second amplitude $\Delta V2$ different from the first amplitude $\Delta V1$.

In the hover gesture mode HGM, a third touch driving signal TDS_HGM having a third amplitude $\Delta V3$ different from the first amplitude $\Delta V1$ may be applied to the touch sensor TS by the touch driving circuit 160. That is, if the hover gesture mode HGM is selected as the touch sensing mode, the touch driving signal TDS may be a third touch driving signal TDS_HGM having a third amplitude $\Delta V3$ different from the first amplitude $\Delta V1$.

For example, referring to FIG. 8, the second amplitude $\Delta V2$ may be greater than the first amplitude $\Delta V1$, and the third amplitude $\Delta V3$ may be greater than or equal to the second amplitude $\Delta V2$.

As described above, depending on the type of the touch sensing mode, effective driving and sensing may be performed for the type of the touch sensing mode by changing the touch driving signal TDS.

Hereinafter, it will be exemplarily described operations related to the first mode control signal MCS1, the second mode control signal MCS2, and the third mode control signal MCS3 in more detail.

Referring to FIG. 8, the touch driving circuit 160 may drive the touch sensor TS by supplying a touch driving signal TDS to the touch sensor TS, and may sense the touch sensor TS. The sensing the touch sensor TS by the touch driving circuit 160 may mean sensing a capacitance (e.g., mutual capacitance) between the touch electrodes TE or sensing a capacitance (e.g., self capacitance) of the touch electrode TE.

The touch controller 170 may supply a reference touch driving signal TDS_REF to the touch driving circuit 160. The reference touch driving signal TDS_REF may be a signal whose voltage level fluctuates or changes. The reference touch driving signal TDS_REF may be a signal having a reference amplitude $\Delta V0$. For example, the reference touch driving signal TDS_REF may be a square wave, a sine wave, a triangle wave, etc. For example, the reference touch driving signal TDS_REF may be a pulse width modulation signal.

The first signal generation unit 810 of the touch driving circuit 160 may generate a touch driving signal TDS to be supplied to the touch sensor TS according to the touch sensing mode using the reference touch driving signal TDS_REF.

For example, each of the first touch driving signal TDS_CTM, the second touch driving signal TDS_HPM, and the third touch driving signal TDS_HGM may be a square wave, a sine wave, a triangle wave, etc. For example, each of the first touch driving signal TDS_CTM, the second touch driving signal TDS_HPM, and the third touch driving signal TDS_HGM may be a pulse width modulation signal. The frequencies of each of the first touch driving signal TDS_CTM, the second touch driving signal TDS_HPM, and the third touch driving signal TDS_HGM may be the same.

The touch controller 170 may control the touch driving circuit 160. In addition, the touch controller 170 may generate a second mode control signal MCS2 and a third mode control signal MCS3 based on the first mode control signal MCS1 received from the display controller 140, and may supply the second mode control signal MCS2 and the third mode control signal MCS3 to the touch driving circuit 160.

The touch controller 170 may supply not only the second mode control signal MCS2 and the third mode control signal MCS3, but also the first mode control signal MCS1 to the touch driving circuit 160, thereby controlling the operation and driving timing of the touch driving signal TDS.

The touch driving circuit 160 may select a touch sensing mode to be performed among a plurality of touch sensing modes based on the first to third mode control signals MCS1, MCS2 and MCS3, and generate and output a touch driving signal TDS suitable for the selected touch sensing mode.

The touch driving circuit 160 may operate according to the timing based on the first to third mode control signals MCS1, MCS2 and MCS3.

The touch driving circuit 160 according to the embodiments of the present disclosure may include a first signal generation unit 810 which receives a reference touch driving signal TDS_REF, second mode control signals MCS2, and third mode control signals MCS3 and generates a touch driving signal TDS in accordance with a touch sensing mode defined by the second mode control signals MCS2 and the third mode control signals MCS3, and a first signal output unit 820 which outputs the touch driving signal TDS generated in accordance with the touch sensing mode to the touch sensor TS.

The touch controller 170 according to the embodiments of the present disclosure may be a control device for controlling a touch sensing operation of a touch display device 100, and may include a second signal input unit 830 and a second signal output unit 840.

The second signal input unit 830 may receive a first mode control signal MCS1 from the display controller 140.

The second signal output unit 840 may be configured to output a reference touch driving signal TDS_REF, and may output a second mode control signal MCS2 and a third mode control signal MCS3 generated based on the first mode control signal MCS1.

The second signal output unit 840 may further output the first mode control signal MCS1.

Figure 9:
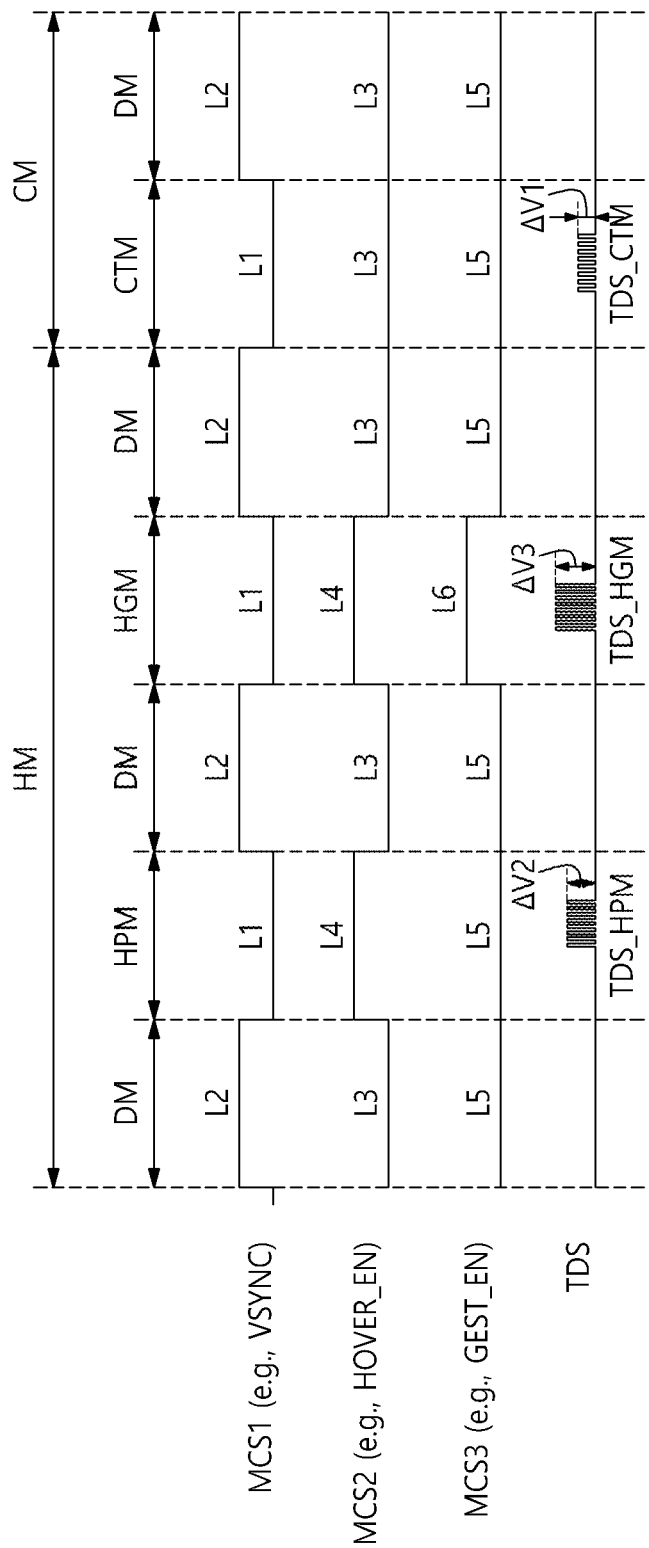
FIG. 9 is a driving timing diagram of a touch display device according to embodiments of the present disclosure.

FIG. 9 is a driving timing diagram of a touch display device 100 according to embodiments of the present disclosure.

Referring to FIG. 9, the contact mode CM may include a display mode DM for displaying an image and a contact touch mode CTM for sensing a contact touch.

Referring to FIG. 9, the hover mode HM may include a display mode DM for displaying an image, a hover pointing mode HPM for sensing a non-contact pointing touch pointing to a point on a screen among non-contact touches, and a hover gesture mode HGM for sensing a non-contact gesture with movement among non-contact touches.

Referring to FIG. 9, the display mode DM, the contact touch mode CTM, the hover pointing mode HPM, and the hover gesture mode HGM may be distinguished from each other by a first mode control signal MCS1, a second mode control signal MCS2, and a third mode control signal MCS3.

Referring to FIG. 9, the first mode control signal MCS1, the second mode control signal MCS2, and the third mode control signal MCS3 may have different signal waveforms.

Referring to FIG. 9, the first mode control signal MCS1 may include a first level voltage section L1 and a second level voltage section L2 which are different from each other.

For example, the first level voltage section L1 may be a low level voltage section, and the second level voltage section L2 may be a high level voltage section. For another example, the first level voltage section L1 may be a high level voltage section, and the second level voltage section L2 may be a low level voltage section.

Referring to FIG. 9, the second mode control signal MCS2 may include a third level voltage section L3 and a fourth level voltage section L4 which are different from each other.

For example, the third level voltage section L3 may be a low level voltage section, and the fourth level voltage section L4 may be a high level voltage section. For another example, the third level voltage section L3 may be a high level voltage section, and the fourth level voltage section L4 may be a low level voltage section.

Referring to FIG. 9, the third mode control signal MCS3 may include a fifth level voltage section L5 and a sixth level voltage section L6 which are different from each other.

For example, the fifth level voltage section L5 may be a low level voltage section, and the sixth level voltage section L6 may be a high level voltage section. For another example, the fifth level voltage section L5 may be a high level voltage section, and the sixth level voltage section L6 may be a low level voltage section.

When the first mode control signal MCS1 is in a second level voltage section L2, the touch display device may operate in the display mode DM.

When the first level voltage section L1 of the first mode control signal MCS1 and the third level voltage section L3 of the second mode control signal MCS2 overlap with each other, the touch display device may operate in the contact touch mode CTM.

When the first level voltage section L1 of the first mode control signal MCS1 and the fourth level voltage section L4 of the second mode control signal MCS2 overlap, if the third mode control signal MCS3 is in the fifth level voltage section L5, the touch display device may operate in the hover pointing mode HPM.

When the first level voltage section L1 of the first mode control signal MCS1 and the fourth level voltage section L4 of the second mode control signal MCS2 overlap, if the third mode control signal MCS3 is in the sixth level voltage section L6, the touch display device may operate in the hover gesture mode HGM.

In the case of the contact touch mode CTM, a first touch driving signal TDS_CTM having a first amplitude $\Delta V1$ may be applied to the touch sensor TS.

In the case of the hover pointing mode HPM, a second touch driving signal TDS_HPM having a second amplitude ΔV2 may be applied to the touch sensor TS.

In the case of the hover gesture mode HGM, a third touch driving signal TDS_HGM having a third amplitude ΔV3 may be applied to the touch sensor TS.

Referring to FIG. 9, for example, the first mode control signal MCS1 may be a vertical synchronization signal VSYNC, which is a display driving control signal for defining a display frame.

Referring to FIG. 9, for example, the second mode control signal MCS2 may be a hover enable signal HOVER_EN for identifying that the operating mode is the hover mode HM.

If the hover enable signal HOVER_EN alternates between different third level voltage section L3 and fourth level voltage section L4, the operating mode may be the hover mode HM.

If the hover enable signal HOVER_EN is maintained in the third level voltage section L3, the operating mode may be a contact mode CM.

If the hover enable signal HOVER_EN is in the fourth level voltage section L4, the operating mode may be one of the hover pointing mode HPM and the hover gesture mode HGM.

Referring to FIG. 9, for example, the third mode control signal MCS3 may be a gesture enable signal GEST_EN as a control signal for distinguishing between the hover pointing mode HPM and the hover gesture mode HGM, which are two touch sensing modes included in the hover mode HM.

If the hover enable signal HOVER_EN is in the fourth level voltage section L4 and the gesture enable signal GEST_EN is in the fifth level voltage section L5, there may be performed the hover pointing mode HPM.

If the hover enable signal HOVER_EN is in the fourth level voltage section L4 and the gesture enable signal GEST_EN is in the sixth level voltage section L6, there may be performed the hover gesture mode HGM.

Hereinafter, for convenience of explanation, it will be exemplified a case in which the first mode control signal MCS1 is a vertical synchronization signal VSYNC, the second mode control signal MCS2 is a hover enable signal HOVER_EN, and the third mode control signal MCS3 is a gesture enable signal GEST_EN.

Figure 10:
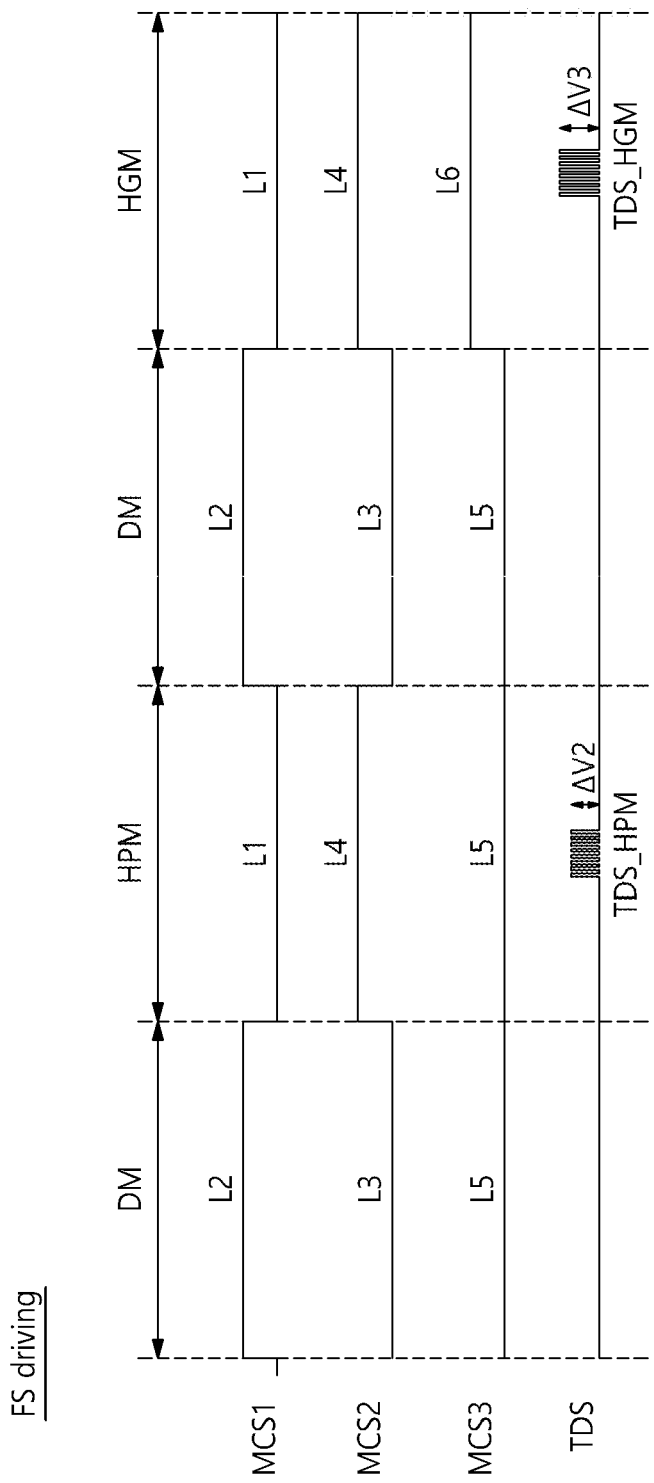
FIG. 10 is a driving timing diagram in a frame single driving method of a touch display device according to embodiments of the present disclosure.

FIG. 10 is a driving timing diagram in a frame single FS driving method of a touch display device 100 according to embodiments of the present disclosure.

Referring to FIG. 10, the touch display device 100 according to the embodiments of the present disclosure may drive the display panel 110 in a frame single FS driving method when the operating mode is a hover mode HM.

Referring to FIG. 10, the hover mode HM may include a display mode DM, a hover pointing mode HPM, and a hover gesture mode HGM.

Referring to FIG. 10, if the touch display device 100 drives the display panel 110 in a frame single FS driving method, only one of the hover pointing mode HPM and the hover gesture mode HGM may exist during one display frame time.

Referring to FIG. 10, if the touch display device 100 drives the display panel 110 in a frame single FS driving method in the hover mode HM, during a period in which the first level voltage section L1 of the first mode control signal MCS1 and the fourth level voltage section L4 of the second mode control signal MCS2 overlap, the third mode control signal MCS3 may be in one of the fifth level voltage section L5 and the sixth level voltage section L6.

Referring to FIG. 10, when the touch display device 100 drives the display panel 110 in the frame single FS driving method in the hover mode HM, the voltage level of the third mode control signal MCS3 may be constant during the period in which the first level voltage section L1 of the first mode control signal MCS1 and the fourth level voltage section L4 of the second mode control signal MCS2 overlap.

Referring to FIG. 10, when the touch display device 100 drives the display panel 110 in the frame single FS driving method in the hover mode HM, the signal applied to the touch sensor TS may have a constant amplitude during the period in which the first level voltage section L1 of the first mode control signal MCS1 and the fourth level voltage section L4 of the second mode control signal MCS2 overlap.

Referring to FIG. 10, during the period in which the first level voltage section L1 of the first mode control signal MCS1 and the fourth level voltage section L4 of the second mode control signal MCS2 overlap, if the third mode control signal MCS3 is in a fifth level voltage section L5, there may be applied a second touch driving signal TDS_HPM having a constant second amplitude ΔV2 to the touch sensor TS.

Referring to FIG. 10, during the period in which the first level voltage section L1 of the first mode control signal MCS1 and the fourth level voltage section LA of the second mode control signal MCS2 overlap, if the third mode control signal MCS3 is in a sixth level voltage section L6, a third touch driving signal TDS_HGM having a constant third amplitude ΔV3 may be applied to the touch sensor TS.

Figure 11:
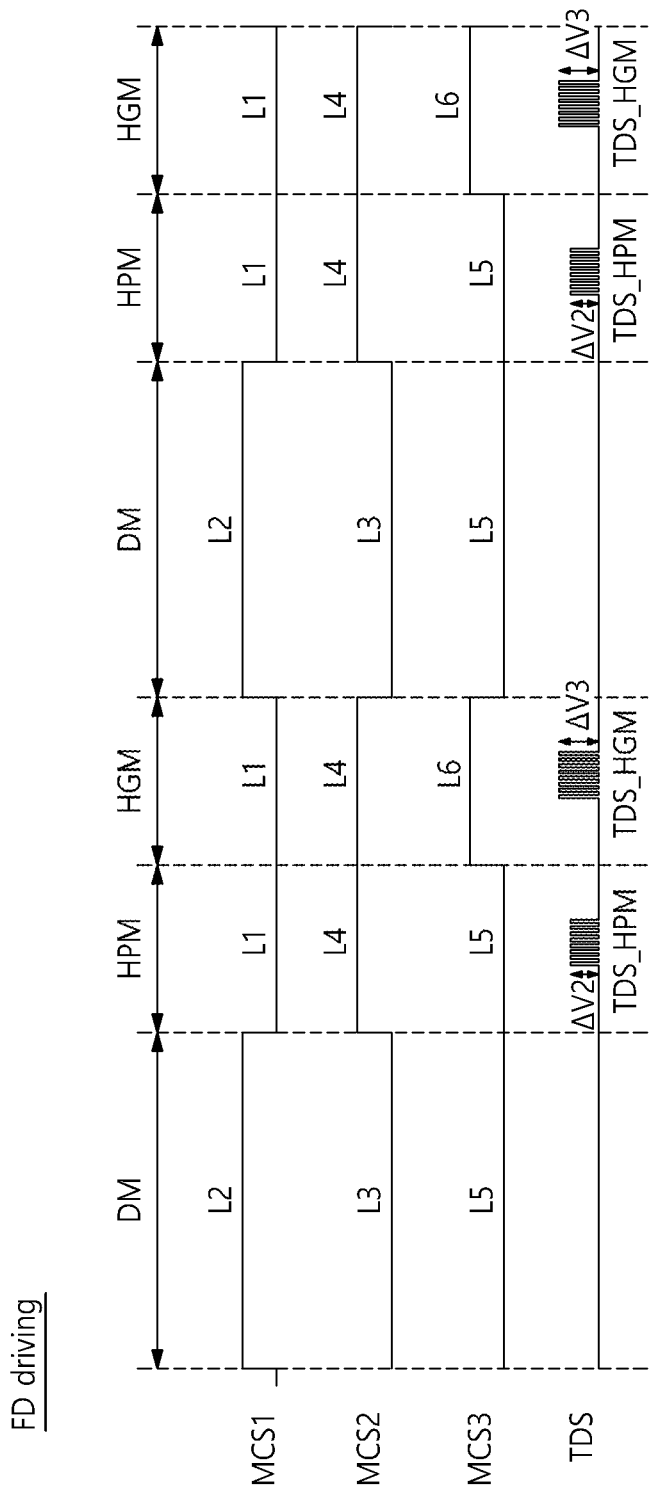
FIG. 11 is a driving timing diagram in a frame double driving method of a touch display device according to embodiments of the present disclosure.

FIG. 11 is a driving timing diagram in a frame double FD driving method of a touch display device 100 according to embodiments of the present disclosure.

Referring to FIG. 11, the touch display device 100 according to the embodiments of the present disclosure may drive the display panel 110 in a frame double FD driving method instead of a frame single FS driving method when the operating mode is a hover mode HM.

Referring to FIG. 11, the hover mode HM may include a display mode DM for displaying an image, a hover pointing mode HPM for sensing a non-contact pointing touch which points to a point on a screen among non-contact touches, and a hover gesture mode HGM for sensing a non-contact gesture with movement among non-contact touches.

Referring to FIG. 11, when the operating mode is the hover mode HM, if the touch display device 100 according to the embodiments of the present disclosure drives the display panel 110 in a frame double FD driving method, both the hover pointing mode HPM and the hover gesture mode HGM may exist during one display frame time.

Referring to FIG. 11, when the operating mode is the hover mode HM, if the touch display device 100 according to the embodiments of the present disclosure drives the display panel 110 in a frame double FD driving method, during the period in which the first level voltage section L1 of the first mode control signal MCS1 and the fourth level voltage section L4 of the second mode control signal MCS2 overlap, the voltage level of the third mode control signal MCS3 may be varied or changed.

Referring to FIG. 11, when the operating mode is a hover mode HM, if the touch display device 100 according to embodiments of the present disclosure drives the display panel 110 in a frame double FD driving method, during a period in which the first level voltage section L1 of the first mode control signal MCS1 and the fourth level voltage section L4 of the second mode control signal MCS2 overlap, the third mode control signal MCS3 may include a first period and a second period.

For example, during the first period of the third mode control signal MCS3, the third mode control signal MCS3 may be in a fifth level voltage section L5. During the second period of the third mode control signal MCS3, the third mode control signal MCS3 may be in a sixth level voltage section L6.

In the third mode control signal MCS3, the first period may be a portion before or after the second period.

Referring to FIG. 11, during the period in which the first level voltage section L1 of the first mode control signal MCS1 and the fourth level voltage section L4 of the second mode control signal MCS2 overlap, the amplitude of the signal applied to the touch sensor TS may be varied or changed.

The period during which the first level voltage section L1 of the first mode control signal MCS1 and the fourth level voltage section L4 of the second mode control signal MCS2 overlap may include a first period during which the signal applied to the touch sensor TS has a second amplitude ΔV2 and a second period during which the signal applied to the touch sensor TS has a third amplitude ΔV3.

During the period during which the first level voltage section L1 of the first mode control signal MCS1 and the fourth level voltage section L4 of the second mode control signal MCS2 overlap, the signal applied to the touch sensor TS may include a second touch driving signal TDS_HPM having a second amplitude ΔV2 and a third touch driving signal TDS_HGM having a third amplitude ΔV3.

The first period of the third mode control signal MCS3 may correspond to a hover pointing mode HPM, and the second period of the third mode control signal MCS3 may correspond to a hover gesture mode HGM. In this case, during the first period of the third mode control signal MCS3, a signal applied to the touch sensor TS may have a second amplitude ΔV2 as a second touch driving signal TDS_HPM. During the second period of the third mode control signal MCS3, a signal applied to the touch sensor TS may have a third amplitude ΔV3 as a third touch driving signal TDS_HGM. Here, the first period may be a front portion or a rear portion of the second period.

Figure 12:
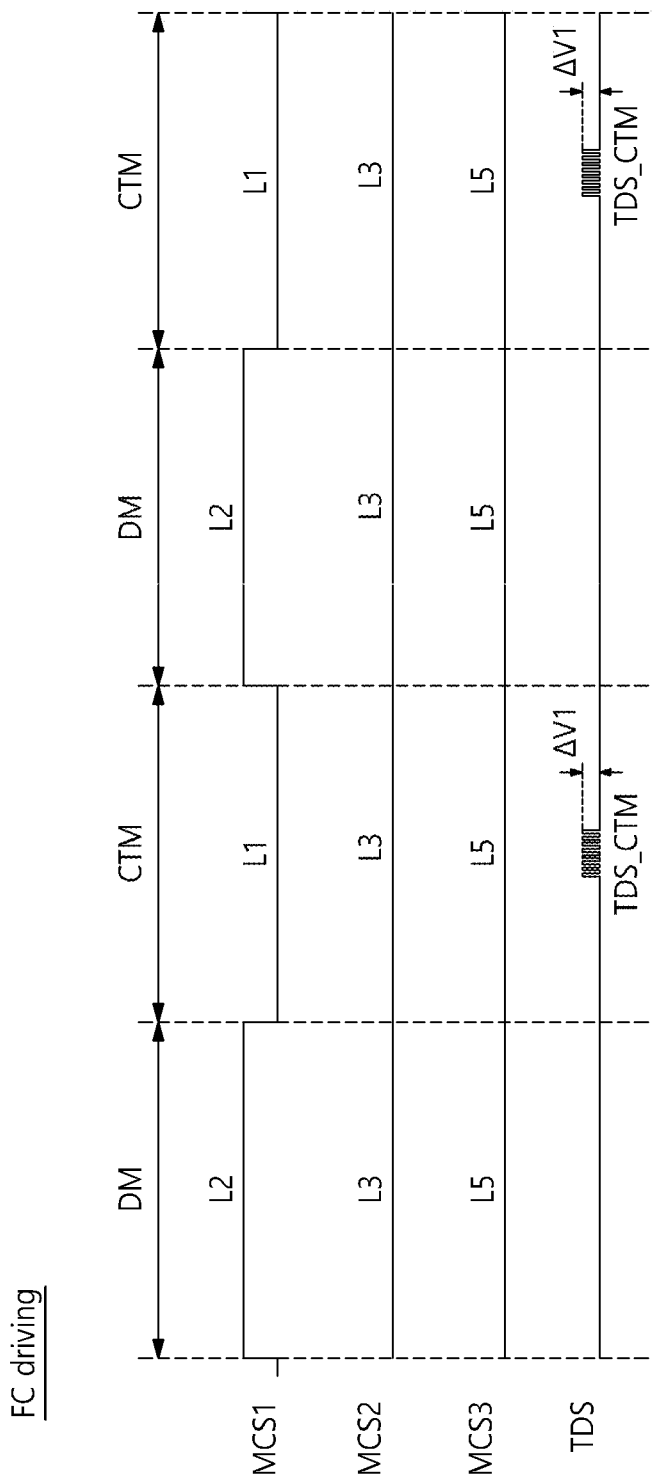
FIG. 12 is a driving timing diagram in a frame contact driving method of a touch display device according to embodiments of the present disclosure.

FIG. 12 is a driving timing diagram in a frame contact FC driving method of a touch display device 100 according to embodiments of the present disclosure.

Referring to FIG. 12, when the operating mode is a contact mode CM, the touch display device 100 according to embodiments of the present disclosure may drive the display panel 110 in a frame contact FC driving method.

Referring to FIG. 12, the contact mode CM may include a display mode DM for displaying an image and a contact touch mode CTM for sensing a contact touch.

Referring to FIG. 12, if the touch display device 100 according to embodiments of the present disclosure drives the display panel 110 in a frame contact FC driving method when the operating mode is a contact mode CM, the display mode DM and the contact touch mode CTM may be alternately performed during one display frame time.

Referring to FIG. 12, when the operating mode is the contact mode CM, the second mode control signal MCS2 may be continuously in the third level voltage section L3, and the third mode control signal MCS3 may be continuously in the fifth level voltage section L5.

Referring to FIG. 12, when the first mode control signal MCS1 is in the second level voltage section L2, the display mode DM may proceed. In this case, the second mode control signal MCS2 may be in the third level voltage section L3, and the third mode control signal MCS3 may be in the fifth level voltage section L5.

Referring to FIG. 12, during a period in which the first level voltage section L1 of the first mode control signal MCS1 and the third level voltage section L3 of the second mode control signal MCS2 overlap, the contact touch mode CTM may proceed.

Referring to FIG. 12, during a period in which the first level voltage section L1 of the first mode control signal MCS1 and the third level voltage section L3 of the second mode control signal MCS2 overlap, the third mode control signal MCS3 may be in a fifth level voltage section L5.

A signal applied to the touch sensor TS may be selectively varied to one of a plurality of amplitudes depending on the type of timing or touch sensing mode.

Referring to FIG. 12, during a period in which the first level voltage section L1 of the first mode control signal MCS1 and the third level voltage section L3 of the second mode control signal MCS2 overlap, the signal applied to the touch sensor TS may have a first amplitude ΔV1 which is the smallest among a plurality of amplitudes (e.g., first amplitude, second amplitude, and third amplitude), as a first touch driving signal TDS_CTM.

The touch display device 100 according to embodiments of the present disclosure may provide efficient operation by controlling channel binding based on switching control (see FIGS. 13A, 13B, 13C, 14A, 14B, 15, 16A, 16B, and 17) differently for each of various touch sensing modes including a contact touch mode CTM, a hover pointing mode HPM, and a hover gesture mode HGM.

Hereinafter, it will be described in detail a method of controlling channel binding based on switching control (see FIGS. 13A, 13B, 13C, 14A, 14B, 16A, 16B, etc.) differently for each of various touch sensing modes.

Figure 13A:
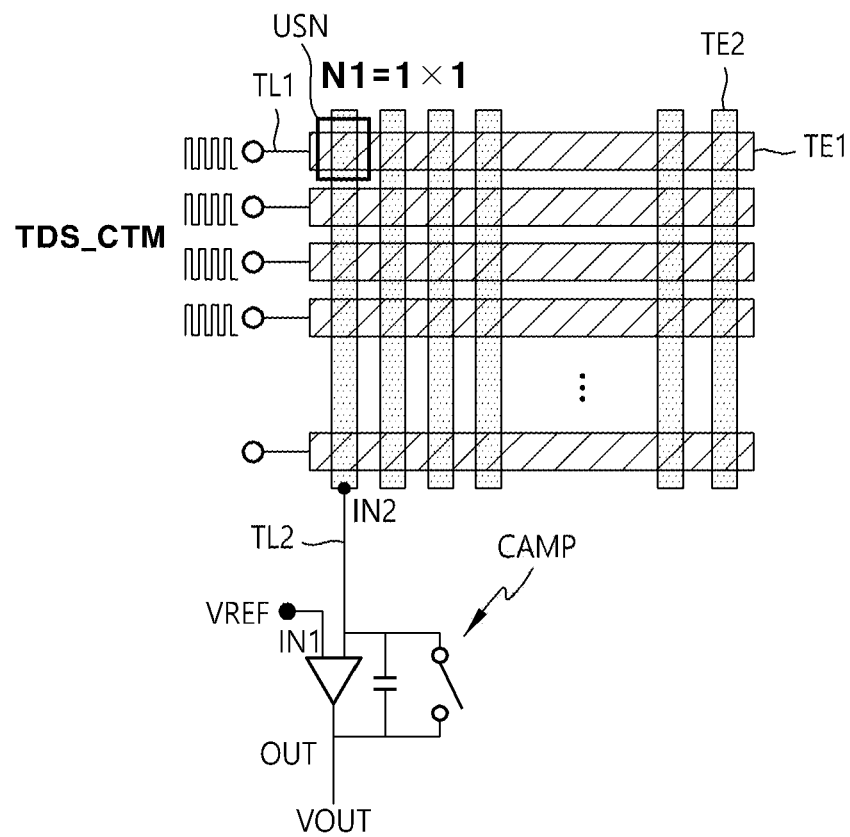
FIG. 13A illustrates an operation state of a touch display device in a contact touch mode according to embodiments of the present disclosure.
Figure 13B:
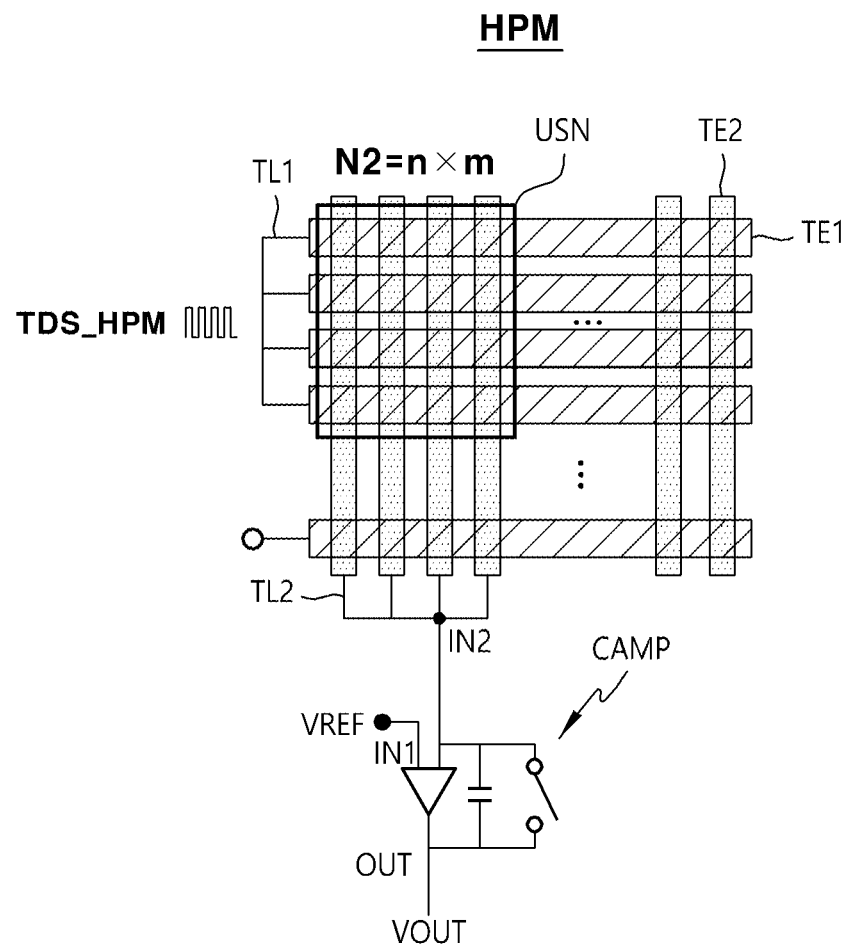
FIG. 13B illustrates an operation state of a touch display device in a hover pointing mode according to embodiments of the present disclosure.
Figure 13C:
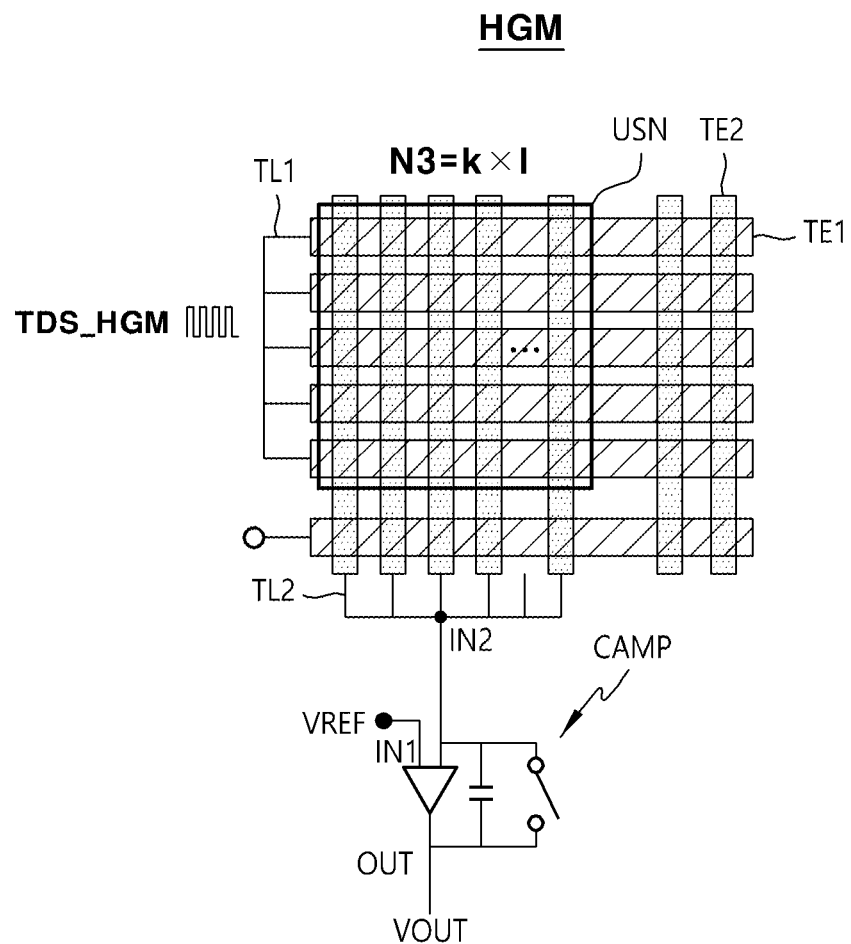
FIG. 13C illustrates an operation state of a touch display device in a hover gesture mode according to embodiments of the present disclosure.

FIG. 13A illustrates an operation state of a touch display device 100 in a contact touch mode CTM according to embodiments of the present disclosure, and FIG. 13B illustrates an operation state of a touch display device 100 in a hover pointing mode HPM according to embodiments of the present disclosure. FIG. 13C illustrates an operation state of a touch display device 100 in a hover gesture mode HGM according to embodiments of the present disclosure.

Referring to FIG. 13A, if a contact touch mode CTM is selected among a display mode DM and a contact touch mode CTM included in a contact mode CM, the number of touch electrodes TE overlapping with a unit sensor node area USN among a plurality of touch electrodes TE may be N1. Here, the "unit sensor node area USN" may be an area capable of being sensed by one charge amplifier CAMP, and may be an area intersected by at least one first touch electrode TE1 to which a touch driving signal TDS is applied together and at least one second touch electrode TE2 connected together with one charge amplifier CAMP.

Referring to FIG. 13B, if the hover pointing mode HPM is selected among the display mode DM, the hover pointing mode HPM, and the hover gesture mode HGM included in the hover mode HM, the number of touch electrodes TE overlapping with the unit sensor node area USN among the plurality of touch electrodes TE may be N2, which may be greater than N1.

Referring to FIG. 13C, if the hover gesture mode HGM is selected among the display mode DM, the hover pointing mode HPM, and the hover gesture mode HGM included in the hover mode HM, the number of touch electrodes TE overlapping with the unit sensor node area USN among the plurality of touch electrodes TE may be N3, which may be greater than or equal to N2.

Referring to FIGS. 13A, 13B, and 13C, the number of touch electrodes N2 overlapping with the unit sensor node area USN in the hover pointing mode HPM may be greater than the number of touch electrodes N1 overlapping with the unit sensor node area USN in the contact touch mode CTM. The number of touch electrodes N3 overlapping with the unit sensor node area USN in the hover gesture mode HGM may be greater than or equal to the number of touch electrodes N2 overlapping with the unit sensor node area USN in the hover pointing mode HPM (i.e., N1<N2≤N3).

Referring to FIGS. 13A, 13B, and 13C, the plurality of touch electrodes TE may include a plurality of first touch electrodes TE1 and a plurality of second touch electrodes TE2 intersecting with each other.

Referring to FIG. 13A, if the contact touch mode CTM is selected among the display mode DM and the contact touch mode CTM included in the contact mode CM, the plurality of first touch electrodes TE1 may be electrically separated from each other, and the plurality of second touch electrodes TE2 may be electrically separated from each other.

Referring to FIG. 13A, in the contact touch mode CTM, a size N1 of the unit sensor node area USN may be 1. That is, the unit sensor node area USN may overlap with one first touch electrode TE1 and one second touch electrode TE2 (e.g., N1=1×1).

In the contact touch mode CTM, a first touch driving signal TDS_CTM may be applied to each of the plurality of first touch electrodes TE1 through a first touch line TL1, and each of the plurality of second touch electrodes TE2 may be connected to a charge amplifier CAMP.

In the contact touch mode CTM, the first touch driving signal TDS_CTM may be input to one first touch line TL1. A second input node IN2 of a charge amplifier CAMP may be connected to a second touch line TL2 connected to a second touch electrode TE2.

Here, the charge amplifier CAMP may include, as described with reference to FIG. 5, a first input node IN1 into which a reference voltage VREF is input as an input voltage VIN having a constant voltage level, a second input node IN2 which may be connected to the second touch line TL2 through a first switch S1, and an output node OUT for outputting an output voltage VOUT (e.g., sensing voltage in analog form).

Referring to FIG. 13B, if the hover pointing mode HPM is selected among the display mode DM, hover pointing mode HPM, and hover gesture mode HGM included in the hover mode HM, n first touch electrodes TE1 among the plurality of first touch electrodes TE1 may be electrically connected to each other, or may be applied with the same second touch driving signal TDS_HPM.

Referring to FIG. 13B, if the hover pointing mode HPM is selected, n first touch lines TL1 respectively connected to n first touch electrodes TE1 among the plurality of first touch electrodes TE1 may be electrically connected to each other. Accordingly, the same second touch driving signal TDS_HPM may be applied to the n first touch electrodes TE1.

When the hover pointing mode HPM is selected, if n first touch lines TL1 respectively connected to n first touch electrodes TE1 among the plurality of first touch electrodes TE1 are not electrically connected to each other, the same second touch driving signal TDS_HPM may be applied to the n first touch electrodes TE1.

Referring to FIG. 13B, if the hover pointing mode HPM is selected, m second touch electrodes TE2 among the plurality of second touch electrodes TE2 may be electrically connected to each other. The m second touch lines TL2 respectively connected to the m second touch electrodes TE2 may be electrically connected to each other, and may be connected together with a second input node IN2 of the corresponding charge amplifier CAMP.

Referring to FIG. 13B, in the hover pointing mode HPM, the size N2 of the unit sensor node area USN may be n*m. That is, the unit sensor node area USN may overlap with n first touch electrodes TE1 and m second touch electrodes TE2 (e.g., N2=n×m).

In the hover pointing mode HPM, a second touch driving signal TDS_HPM may be simultaneously supplied to n first touch electrodes TE1 among a plurality of first touch electrodes TE1.

In the hover pointing mode HPM, m second touch electrodes TE2 among the plurality of second touch electrodes TE2 may be connected with a second input node IN2 of one charge amplifier CAMP. Here, n may be a natural number greater than or equal to 2, and m may be a natural number greater than or equal to 2.

That is, in the hover pointing mode HPM, the second touch driving signal TDS_HPM may be simultaneously input to n first touch lines TL1 connected to n first touch electrodes TE1, and the second input node IN2 of one charge amplifier CAMP may be connected to m second touch lines TL2 connected to m second touch electrodes TE2.

Referring to FIG. 13C, if the hover gesture mode HGM is selected among the display mode DM, hover pointing mode HPM, and hover gesture mode HGM included in the hover mode HM, k first touch electrodes TE1 among the plurality of first touch electrodes TE1 may be electrically connected to each other, or may be applied with the same third touch driving signal TDS_HGM, and l second touch electrodes TE2 among the plurality of second touch electrodes TE2 may be electrically connected to each other.

Referring to FIG. 13C, in the hover gesture mode HGM, a third touch driving signal TDS_HGM may be simultaneously supplied to k first touch electrodes TE1 among the plurality of first touch electrodes TE1.

Referring to FIG. 13C, in the hover gesture mode HGM, k first touch lines TL1 respectively connected to k first touch electrodes TE1 among a plurality of first touch electrodes TE1 may be electrically connected to each other. Accordingly, the same third touch driving signal TDS_HGM may be applied to the k first touch electrodes TE1.

In the hover gesture mode HGM, if k first touch lines TL1 respectively connected to k first touch electrodes TE1 among the plurality of first touch electrodes TE1 are not electrically connected to each other, the same third touch driving signal TDS_HGM may be applied to the k first touch electrodes TE1.

Referring to FIG. 13C, l second touch electrodes TE2 among the plurality of second touch electrodes TE2 may be connected to the second input node IN2 of one charge amplifier CAMP. Here, k may be a natural number greater than or equal to 2, and l may be a natural number greater than or equal to 2. Here, l second touch lines TL2 respectively connected to l second touch electrodes TE2 may be electrically connected to each other, and may be connected together with a second input node IN2 of the corresponding charge amplifier CAMP.

That is, in the hover gesture mode HGM, the third touch driving signal TDS_HGM may be simultaneously input to k first touch lines TL1 connected to k first touch electrodes TE1, and the second input node IN2 of one charge amplifier CAMP may be connected to l second touch lines TL2 connected to l second touch electrodes TE2.

Referring to FIGS. 13A, 13B and 13C, the number of touch electrodes N1 overlapping with the unit sensor node area USN in the contact touch mode CTM may be 1. The number of touch electrodes N2 overlapping with the unit sensor node area USN in the hover pointing mode HPM may be a value (n×m) obtained by multiplying n and m. The number of touch electrodes N3 overlapping with the unit sensor node area USN in the hover gesture mode HGM may be a value (k×l) obtained by multiplying k by l, and may be greater than or equal to the number of touch electrodes N2 overlapping with the unit sensor node area USN in the hover pointing mode HPM (i.e., N1<N2≤N3).

Referring to FIGS. 13A, 13B, and 13C, the number of touch electrodes (i.e., N2=n×m) overlapping with the unit sensor node area USN in the hover pointing mode HPM may be greater than 1 (i.e., N1=1), and may be less than or equal to the number of touch electrodes (i.e., N3=k×l) overlapping with the unit sensor node area USN in the hover gesture mode HGM (i.e., N1<N2≤N3).

Referring to FIGS. 13A, 13B, and 13C, the product of k and l may be greater than or equal to the product of n and m, and the product of n and m may be greater than l (i.e., N1<(n×m)≤(k×l)).

Referring to FIGS. 13A, 13B, and 13C, the product of k and l may indicate the size of a single touch sensing area in a hover gesture mode HGM. The product of n and m may indicate the size of a single touch sensing area in a hover pointing mode HPM.

Referring to FIGS. 13A, 13B, and 13C, the single touch sensing area may indicate an area defined by one or more first touch electrodes TE1 driven together and one or more second touch electrodes TE2 sensed together. Here, one or more second touch electrodes TE2 sensed together may be electrically connected to each other, and may be sensed together by one charge amplifier CAMP. A touch driving signal TDS may be applied simultaneously to one or more first touch electrodes TE1 which are driven together.

Figure 14A:
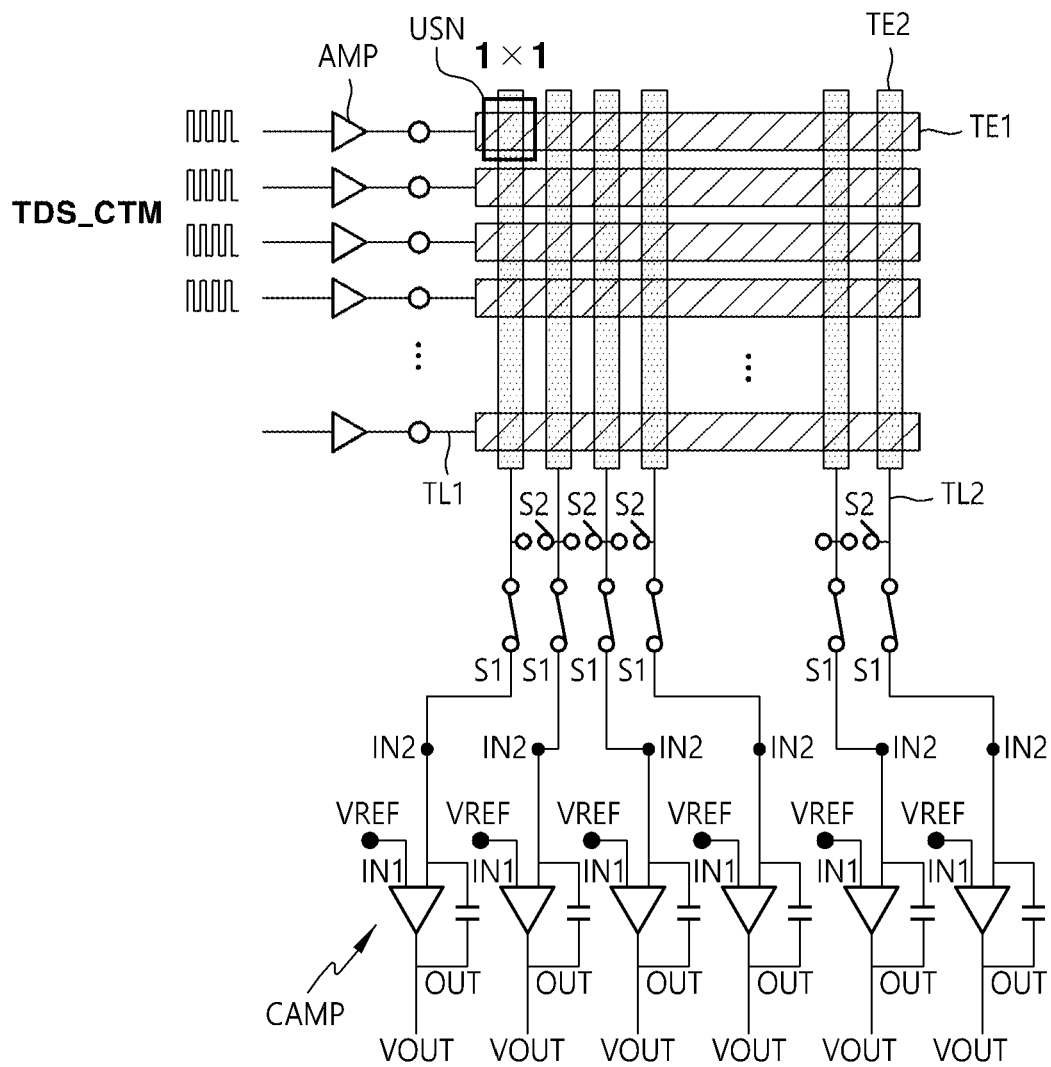
FIG. 14A illustrates an operation state according to a non-coded driving method in a contact touch mode of a touch display device according to embodiments of the present disclosure and a switch structure for the operation state.
Figure 14B:
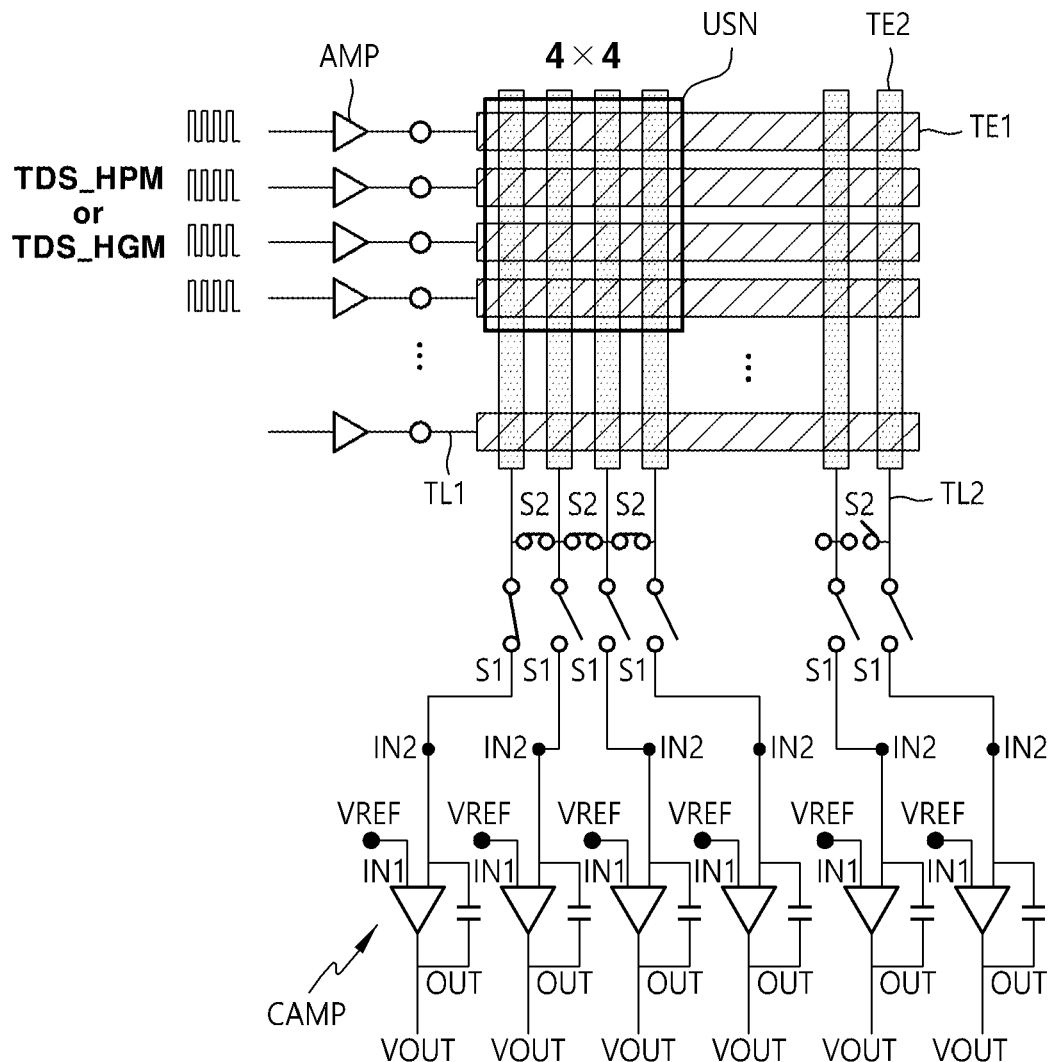
FIG. 14B illustrates an operation state according to a non-coded driving method in a hover pointing mode or a hover gesture mode of a touch display device according to embodiments of the present disclosure and a switch structure for the operation state.

FIG. 14A illustrates an operation state according to a non-coded driving method in a contact touch mode CTM of a touch display device 100 according to an embodiment of the present disclosure and a switch structure for the operation state, and FIG. 14B illustrates an operation state according to a non-coded driving method in a hover pointing mode HPM or a hover gesture mode HGM of a touch display device 100 according to an embodiment of the present disclosure and a switch structure for the operation state.

In FIG. 14B, for convenience of explanation, there is exemplified a case where the size of the unit sensor node area USN in the hover pointing mode HPM (e.g., N2 in FIG. 13B) and the size of the unit sensor node area USN in the hover gesture mode HGM (e.g., N3 in FIG. 13C) are same and equal to 16.

Referring to FIGS. 14A and 14B, the touch sensor TS may include a plurality of first touch electrodes TE1 and a plurality of second touch electrodes TE2.

Referring to FIGS. 14A and 14B, the touch display device 100 according to the embodiments of the present disclosure may include a plurality of amplifiers AMP connected to a plurality of first touch electrodes TE1, a plurality of charge amplifiers CAMPs corresponding to a plurality of second touch electrodes TE2, a plurality of first switches S1 for controlling a connection between the plurality of second touch electrodes TE2 and the plurality of charge amplifiers CAMP, and a plurality of second switches S2 for controlling a connection between two adjacent second touch electrodes TE2 among the plurality of second touch electrodes TE2.

Referring to FIGS. 14A and 14B, the plurality of first touch electrodes TE1 and the plurality of amplifiers AMP may be connected through a plurality of first touch lines TL1.

The connection method of the plurality of first touch electrodes TE1 and the plurality of amplifiers AMP may be implemented in various ways. As shown in FIGS. 14A and 14B, the plurality of first touch electrodes TE1 and the plurality of amplifiers AMP may be connected one-to-one. Alternatively or additionally, some of the plurality of amplifiers AMP may be connected to the plurality of first touch electrodes TE1 (as shown in FIG. 16B).

Referring to FIGS. 14A and 14B, the plurality of second touch electrodes TE2 and the plurality of first switches S1 may be connected through a plurality of second touch lines TL2.

Referring to FIG. 14A and FIG. 14B, one end of each of the plurality of first switches S1 may be connected to the corresponding second touch line TL2 connected to the corresponding second touch electrode TE2, and the other end of each of the plurality of first switches S1 may be connected to a second input node IN2 of the corresponding charge amplifier CAMP.

Here, the charge amplifier CAMP may include, as described with reference to FIG. 5, a first input node IN1 into which a reference voltage VREF is input as an input voltage VIN having a constant voltage level, a second input node IN2 which may be connected to the corresponding second touch line TL2 through the corresponding first switch S1, and an output node OUT from which an output voltage VOUT (e.g., sensing voltage in analog form) is output.

Referring to FIGS. 14A and 14B, on-off of a plurality of first switches S1 and a plurality of second switches S2 may be controlled according to a touch sensing mode selected from among a contact touch mode CTM, a hover pointing mode HPM, and a hover gesture mode HGM.

Referring to FIG. 14A, in the contact touch mode CTM, the size of a unit sensor node area USN may be 1 (i.e., 1*1). Therefore, in the contact touch mode CTM, each of the plurality of first touch electrodes TE1 may be individually driven by a corresponding amplifier AMP, and each of the plurality of second touch electrodes TE2 may be individually sensed by a corresponding charge amplifier CAMP.

Here, the feature that each of the plurality of first touch electrodes TE1 is individually driven by the corresponding amplifier AMP may mean that the plurality of first touch electrodes TE1 are electrically separated within the display panel 110, and one first touch electrode TE1 receives the first touch driving signal TDS_CTM from one amplifier AMP.

Here, the feature that each of the plurality of second touch electrodes TE2 is individually sensed by the corresponding charge amplifier CAMP may mean that the plurality of second touch electrodes TE2 are electrically separated within the display panel 110, so that the electrical state (e.g., charge amount, voltage, etc.) of one second touch electrode TE2 can be detected by one charge amplifier CAMP.

Referring to FIG. 14A, in the contact touch mode CTM, the first touch driving signal TDS_CTM may be applied to each of the plurality of first touch electrodes TE1 through each of the plurality of amplifiers AMP.

Referring to FIG. 14A, in the contact touch mode CTM, if the same first touch driving signal TDS_CPM is applied to the plurality of first touch electrodes TE1, the plurality of first touch electrodes TE1 may be electrically separated or electrically connected in the contact touch mode CTM.

Referring to FIG. 14A, in the contact touch mode CTM, the plurality of second switches S2 may all be turned off, so that the plurality of second touch electrodes TE2 may be electrically separated from each other.

Referring to FIG. 14A, in the contact touch mode CTM, the plurality of first switches S1 may be turned on, and the plurality of second touch electrodes TE2 may be electrically connected to the plurality of charge amplifiers CAMP by the plurality of first switches S1.

Referring to FIG. 14B, in the hover pointing mode HPM or the hover gesture mode HGM, for example, the size of the unit sensor node area USN is 16 (i.e., 4*4) which is greater than 1. Therefore, in the hover pointing mode HPM or the hover gesture mode HGM, four first touch electrodes TE1 among the plurality of first touch electrodes TE1 may be driven together or have the same driving state, and four second touch electrodes TE2 among the plurality of second touch electrodes TE2 may be sensed together.

Referring to FIG. 14B, in the hover pointing mode HPM or the hover gesture mode HGM, a second touch driving signal TDS_HPM or a third touch driving signal TDS_HGM may be simultaneously applied to two or more first touch electrodes TE1 among the plurality of first touch electrodes TE1 through at least one amplifier AMP among the plurality of amplifiers AMP.

Referring to FIG. 14B, in the hover pointing mode HPM or the hover gesture mode HGM, two or more second touch electrodes TE2 among the plurality of second touch electrodes TE2 may be electrically connected to each other by at least one second switch S2 among the plurality of second switches S2.

Referring to FIG. 14B, two or more second touch electrodes TE2 may be electrically connected to one charge amplifier CAMP among the plurality of charge amplifiers CAMP by one first switch S1 among the plurality of first switches S1.

According to the example of FIG. 14B, in the hover pointing mode HPM or the hover gesture mode HGM, the second touch driving signal TDS_HPM or the third touch driving signal TDS_HGM may be simultaneously applied to four first touch electrodes TE1 among the plurality of first touch electrodes TE1 through four amplifiers AMP or one amplifier AMP among the plurality of amplifiers AMP, and four second touch electrodes TE2 among the plurality of second touch electrodes TE2 may be electrically connected to each other by three second switches S2 among the plurality of second switches S2.

According to the example of FIG. 14B, four second touch electrodes TE2 may be electrically connected to one charge amplifier CAMP among the plurality of charge amplifiers CAMP by one first switch S1 among the plurality of first switches S1. Here, one charge amplifier CAMP connected to the four second touch electrodes TE2 may be a charge amplifier CAMP located at the far left in FIG. 14B.

Referring to FIGS. 14A and 14B, even if the driving time elapses or the position where the first touch driving signal TDS_CTM is applied changes, a phase of the first touch driving signal TDS_CTM may be constant. In this case, driving the plurality of first touch electrodes TE1 with the first touch driving signal TDS_CTM having a constant phase may be referred to as a "non-coded driving."

In FIGS. 14A and 14B, a plurality of amplifiers AMP and a plurality of charge amplifiers CAMP may be included within the touch driving circuit 160.

In FIGS. 14A and 14B, a plurality of first switches S1 and/or a plurality of second switches S2 may be included within the touch driving circuit 160. In some cases, the plurality of first switches S1 and/or a plurality of second switches S2 may be disposed on the display panel 110.

Figure 15:
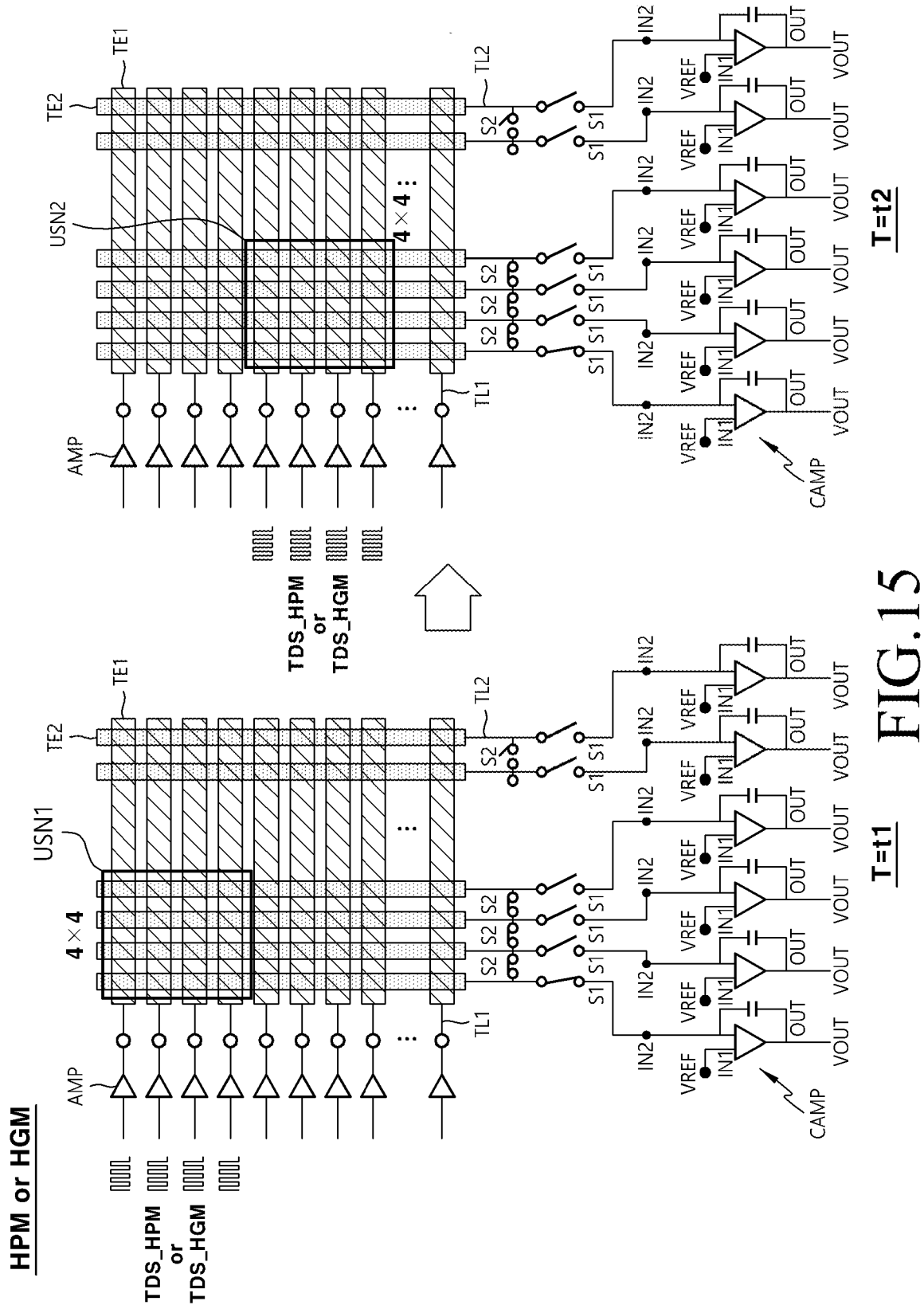
FIG. 15 illustrates an operation change according to a non-coded driving method in a hover pointing mode or a hover gesture mode of a touch display device according to embodiments of the present disclosure.

FIG. 15 illustrates a change in operation according to a non-coded driving method in a hover pointing mode HPM or a hover gesture mode HGM of a touch display device 100 according to embodiments of the present disclosure.

FIG. 15 illustrates an operation state and the switch structure for the operation state in a first time period (T=t1) while operating in the hover pointing mode HPM or the hover gesture mode HGM, and an operation state and the switch structure for the operation state in a second time period (T=t2) after the first time period (T=t1).

In FIG. 15, the operation state and the switch structure for the operation state in the first time period (T=t1) when operating in the hover pointing mode HPM or the hover gesture mode HGM may be the same as those in FIG. 14B.

In FIG. 15, for convenience of explanation, there is exemplified a case where the size of the unit sensor node area USN1 and USN2 (e.g., N2 in FIG. 13B) in the hover pointing mode HPM and the size of the unit sensor node area USN1 and USN2 (e.g., N3 in FIG. 13C) in the hover gesture mode HGM are equal to 16.

Referring to FIG. 15, in the hover pointing mode HPM or the hover gesture mode HGM, during the first time period (T=t1), one of the four first switches S1 corresponding to the first unit sensor node area USN1 may be turned on, and all three second switches S2 corresponding to the first unit sensor node area USN1 may be turned on.

Referring to FIG. 15, during a period in which the hover mode HM is in progress, in the hover pointing mode HPM or the hover gesture mode HGM, the touch driving circuit 160 may sense the first unit sensor node area USN1 during the first time period (T=t1).

Referring to FIG. 15, in the hover pointing mode HPM or the hover gesture mode HGM, during the first time period (T=t1), the second touch driving signal TDS_HPM or the third touch driving signal TDS_HGM may be simultaneously applied to two or more (e.g., four) first touch electrodes TE1 among the plurality of first touch electrodes TE1 through at least one (e.g., four) amplifiers AMP among the plurality of amplifiers AMP.

Referring to FIG. 15, in the hover pointing mode HPM or the hover gesture mode HGM, during the first time period (T=t1), two or more (e.g., four) second touch electrodes TE2 among the plurality of second touch electrodes TE2 may be electrically connected to each other by at least one (e.g., three) second switches S2 among the plurality of second switches S2.

Referring to FIG. 15, in the hover pointing mode HPM or the hover gesture mode HGM, during the first time period (T=t1), two or more (e.g., four) second touch electrodes TE2 may be electrically connected to one charge amplifier CAMP among the plurality of charge amplifiers CAMP by one first switch S1 among the plurality of first switches S1.

Referring to FIG. 15, in the hover pointing mode HPM or the hover gesture mode HGM, during the first time period (T=t1), among the plurality of first touch electrodes TE1, two or more (e.g., four) first touch electrodes TE1 to which the second touch driving signal TDS_HPM or the third touch driving signal TDS_HGM is simultaneously applied may overlap with the first unit sensor node area USN1.

Referring to FIG. 15, in the hover pointing mode HPM or the hover gesture mode HGM, during the first time period (T=t1), two or more (e.g., four) second touch electrodes TE2 electrically connected to each other by at least one (e.g., three) second switch S2 among the plurality of second touch electrodes TE2 may overlap with the first unit sensor node area USN1.

Referring to FIG. 15, in the hover pointing mode HPM or the hover gesture mode HGM, during the first time period (T=t1), four first touch electrodes TE1 to which the second touch driving signal TDS_HPM or the third touch driving signal TDS_HGM is simultaneously applied, and four second touch electrodes TE2 electrically connected to each other by three second switches S2 may intersect each other to form a first unit sensor node area USN1.

Referring to FIG. 15, four first touch electrodes TE1 to which the second touch driving signal TDS_HPM or the third touch driving signal TDS_HGM is simultaneously applied, and four second touch electrodes TE2 electrically connected to each other by three second switches S2 may form one first mutual capacitance.

Referring to FIG. 15, for the first unit sensor node area USN1, one charge amplifier CAM connected to four second touch electrodes TE2 electrically connected to each other by three second switches S2 by the first switch S1 may output a sensing signal VOUT according to the first mutual capacitance or the corresponding charge amount.

The first mutual capacitance may be a capacitance formed between four first touch electrodes TE1 to which the second touch driving signal TDS_HPM or the third touch driving signal TDS_HGM is applied simultaneously and four second touch electrodes TE2 electrically connected to each other by three second switches S2.

Referring to FIG. 15, during the period in which the hover mode HM is in progress, in the hover pointing mode HPM or the hover gesture mode HGM, the touch driving circuit 160 may sense the second unit sensor node area USN2 different from the first unit sensor node area USN1 during the second time period (T=t2) after the first time period (T=t1).

Referring to FIG. 15, in the hover pointing mode HPM or the hover gesture mode HGM, during the second time period (T=t2), a second touch driving signal TDS_HPM or a third touch driving signal TDS_HGM may be simultaneously applied to two or more (e.g., four) other first touch electrodes TE1 among the plurality of first touch electrodes TE1 through at least one (e.g., four) other amplifiers AMP among the plurality of amplifiers AMP.

Referring to FIG. 15, in the hover pointing mode HPM or the hover gesture mode HGM, during the second time period (T=t2), two or more (e.g., four) second touch electrodes TE2 among the plurality of second touch electrodes TE2 may be electrically connected to each other by at least one (e.g., three) second switches S2 among the plurality of second switches S2.

Referring to FIG. 15, in the hover pointing mode HPM or the hover gesture mode HGM, during the second time period (T=t2), two or more (e.g., four) second touch electrodes TE2 may be electrically connected to one charge amplifier CAMP among the plurality of charge amplifiers CAMP by one first switch S1 among the plurality of first switches S1.

Referring to FIG. 15, in the hover pointing mode HPM or the hover gesture mode HGM, during the second time period (T=t2), among the plurality of first touch electrodes TE1, two or more (e.g., four) other first touch electrodes TE1 to which the second touch driving signal TDS_HPM or the third touch driving signal TDS_HGM is simultaneously applied may overlap with the second unit sensor node area USN2.

Referring to FIG. 15, in the hover pointing mode HPM or the hover gesture mode HGM, during the second time period (T=t2), two or more (e.g., four) second touch electrodes TE2 electrically connected to each other by at least one (e.g., three) second switches S2 among the plurality of second touch electrodes TE2 may overlap with the second unit sensor node area USN2.

Referring to FIG. 15, in the hover pointing mode HPM or the hover gesture mode HGM, during the second time period (T=t2), four other first touch electrodes TE1 to which the second touch driving signal TDS_HPM or the third touch driving signal TDS_HGM is simultaneously applied, and four second touch electrodes TE2 electrically connected to each other by three second switches S2 may intersect with each other to form a second unit sensor node area USN2 that is different from the first unit sensor node area USN1.

Referring to FIG. 15, four other first touch electrodes TE1 to which the second touch driving signal TDS_HPM or the third touch driving signal TDS_HGM is applied simultaneously, and four second touch electrodes TE2 electrically connected to each other by three second switches S2 may form one second mutual capacitance.

Referring to FIG. 15, for the second unit sensor node area USN2, one charge amplifier CAMP connected to four other second touch electrodes TE2 electrically connected to each other by three second switches S2 by the first switch S1 may output a sensing signal VOUT according to the second mutual capacitance or the corresponding charge amount.

The second mutual capacitance may be a capacitance formed between four other first touch electrodes TE1 to which the second touch driving signal TDS_HPM or the third touch driving signal TDS_HGM is simultaneously applied and four second touch electrodes TE2 electrically connected to each other by three second switches S2.

Referring to FIG. 15, according to the non-coded driving method, in the hover pointing mode HPM, a second touch driving signal TDS_HPM that is simultaneously applied to two or more (e.g., four) first touch electrodes TE1 during a first time period (T=t1) and a second touch driving signal TDS_HPM that is simultaneously applied to two or more (e.g., four) other first touch electrodes TE1 during a second time period (T=t2) may have the same phase.

Referring to FIG. 15, according to the non-coded driving method, in the hover gesture mode HGM, a third touch driving signal TDS_HGM simultaneously applied to two or more (e.g., four) first touch electrodes TE1 during a first time period (T=t1) and a third touch driving signal TDS_HGM simultaneously applied to two or more (e.g., four) other first touch electrodes TE1 during a second time period (T=t2) may have the same phase.

Figure 16A:
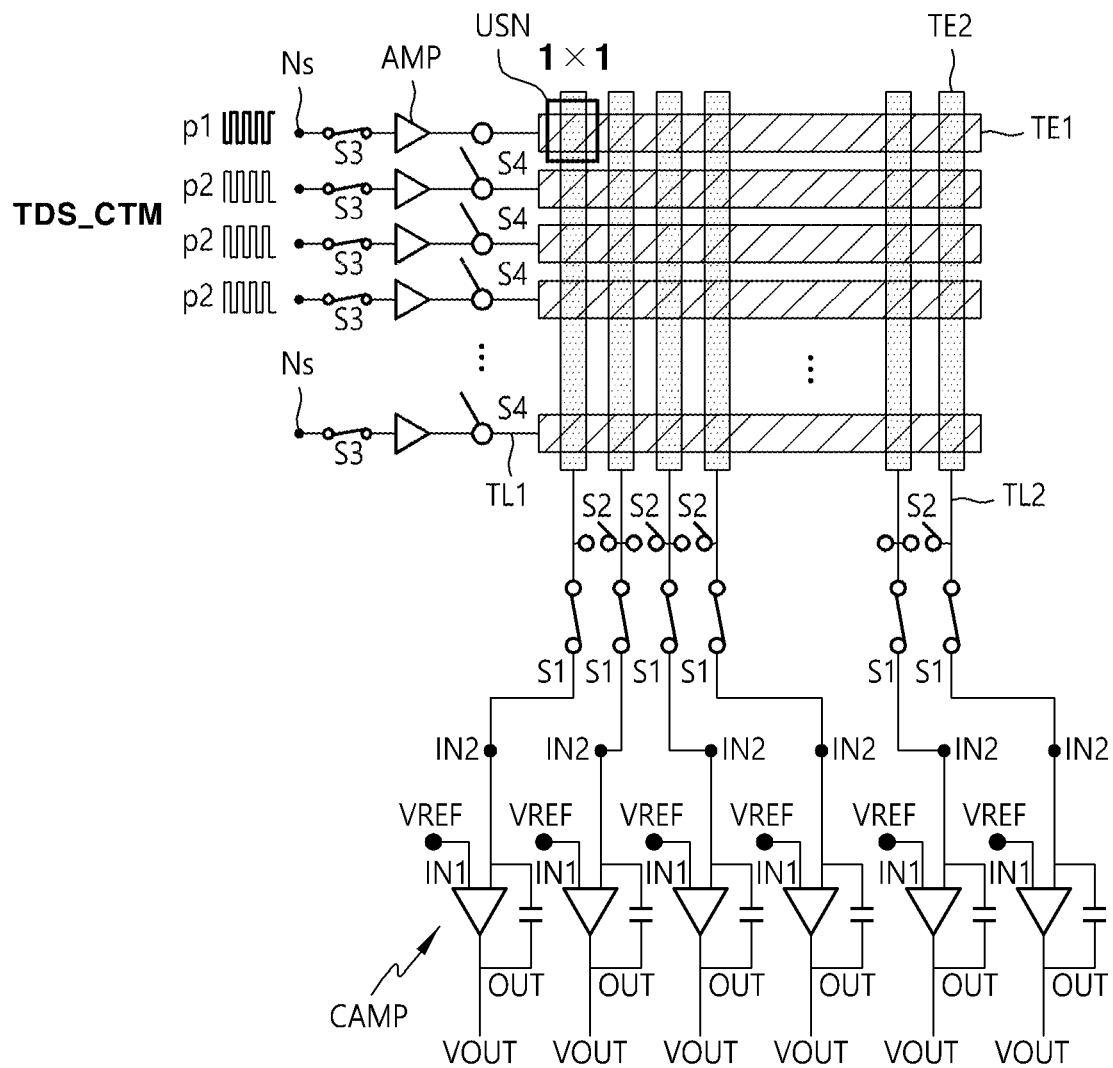
FIG. 16A illustrates an operation state according to a coded driving method in a contact touch mode of a touch display device according to embodiments of the present disclosure and a switch structure for the operation state.
Figure 16B:
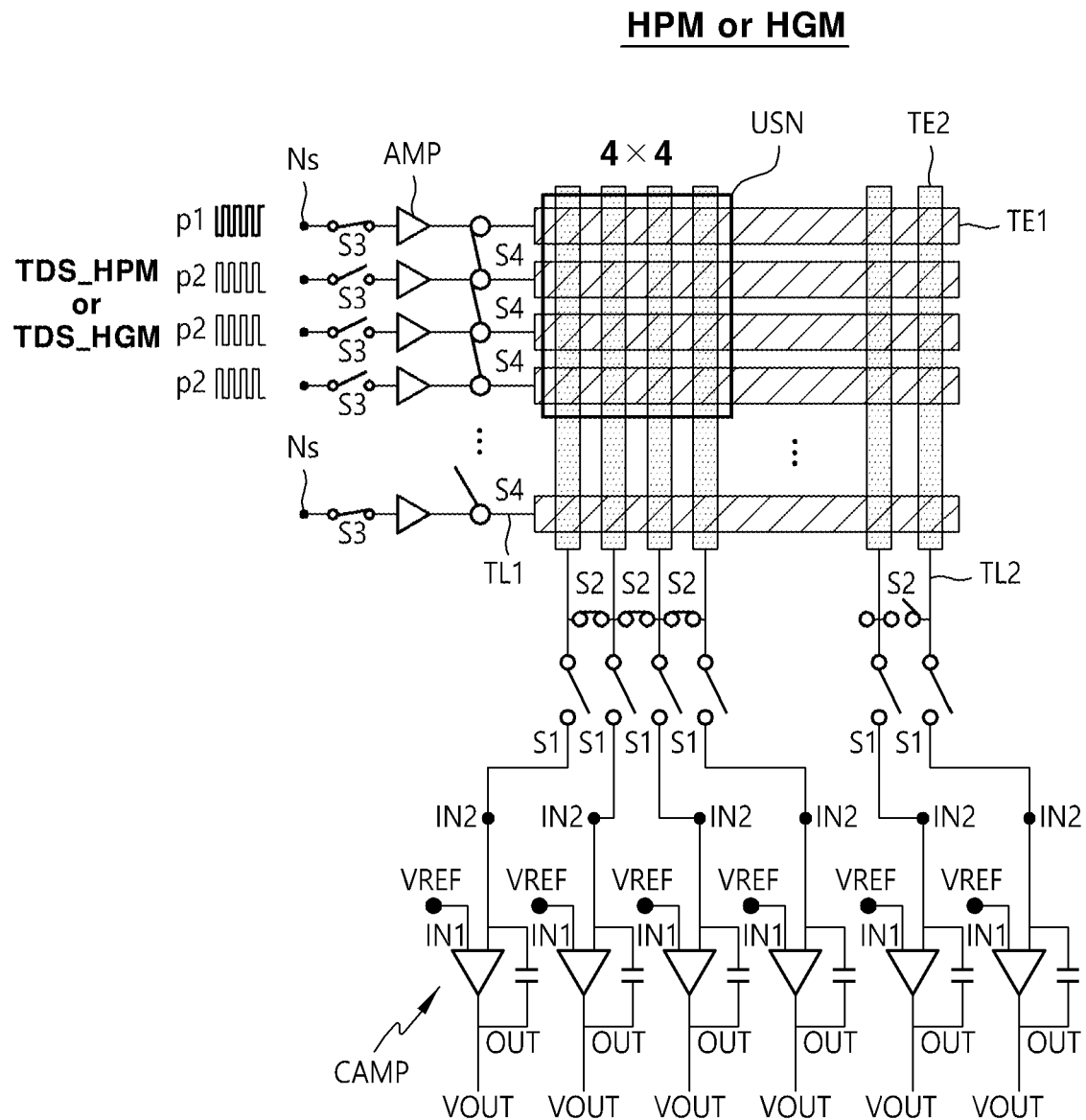
FIG. 16B illustrates an operation state according to a coded driving method in a hover pointing mode or a hover gesture mode of a touch display device according to an embodiment of the present disclosure and a switch structure for the operation state.

FIG. 16A illustrates an operation state according to a coded driving method in a contact touch mode CTM of a touch display device 100 according to an embodiment of the present disclosure and a switch structure therefor, and FIG. 16B illustrates an operation state according to a coded driving method in a hover pointing mode HPM or a hover gesture mode HGM of a touch display device 100 according to an embodiment of the present disclosure and a switch structure therefor.

The operation state and the switch structure for the operation state according to the coded driving method in the contact touch mode CTM of FIG. 16A may be basically the same as the operation state and the switch structure thereof according to the non-coded driving method in the contact touch mode CTM of FIG. 14A.

Therefore, in describing the operation state and the switch structure for the operation state according to the coded driving method in the contact touch mode CTM with reference to FIG. 16A, it will be mainly described the differences from the operation state and the switch structure thereof according to the non-coded driving method in the contact touch mode CTM of FIG. 14A.

The operation state and the switch structure for the operation state according to the coded driving method in the hover pointing mode HPM or the hover gesture mode HGM of FIG. 16B may be basically the same as the operation state and the switch structure for the operation state according to the non-coded driving method in the hover pointing mode HPM or the hover gesture mode HGM of FIG. 14B.

Therefore, in describing the operation state and the switch structure for the operation state according to the coded driving method in the hover pointing mode HPM or the hover gesture mode HGM with reference to FIG. 16B, it will be mainly described the differences from the operation state and the switch structure for the operation state according to the non-coded driving method in the hover pointing mode HPM or the hover gesture mode HGM of FIG. 14B.

Referring to FIG. 16A and FIG. 16B, the touch display device 100 according to the embodiment of the present disclosure may further include a plurality of third switches S3 between a plurality of signal input nodes Ns and a plurality of amplifiers AMP, and a plurality of fourth switches S4 for controlling a connection between two adjacent first touch electrodes TE1 among a plurality of first touch electrodes TE1.

The plurality of third switches S3 and the plurality of fourth switches S4 may also be equally applied to FIG. 14A and FIG. 14B.

Referring to FIGS. 16A and 16B, each of the first touch driving signal TDS_CTM, the second touch driving signal TDS_HPM, and the third touch driving signal TDS_HGM may have different phases p1 and p2 according to a change in the time period for coded driving.

Referring to FIGS. 16A and 16B, depending on the touch sensing mode selected among the hover pointing mode HPM, the hover gesture mode HGM and the contact touch mode CTM, the number of third switches S3 turned on among the plurality of third switches S3 may vary, and the number of fourth switches S4 turned on among the plurality of fourth switches S4 may vary.

For example, as illustrated in FIG. 16A, if the contact touch mode CTM is selected as the touch sensing mode among the hover pointing mode HPM, the hover gesture mode HGM and the contact touch mode CTM, all of the third switches S3 may be turned on, and all of the fourth switches S4 may be turned off.

For another example, as illustrated in FIG. 16B, if the hover pointing mode HPM or the hover gesture mode HGM is selected as the touch sensing mode among the hover pointing mode HPM, the hover gesture mode HGM and the contact touch mode CTM, one third switch S3 may be turned on for each unit sensor node area USN, and all of the fourth switches S4 may be turned on for each unit sensor node area USN.

Figure 17:
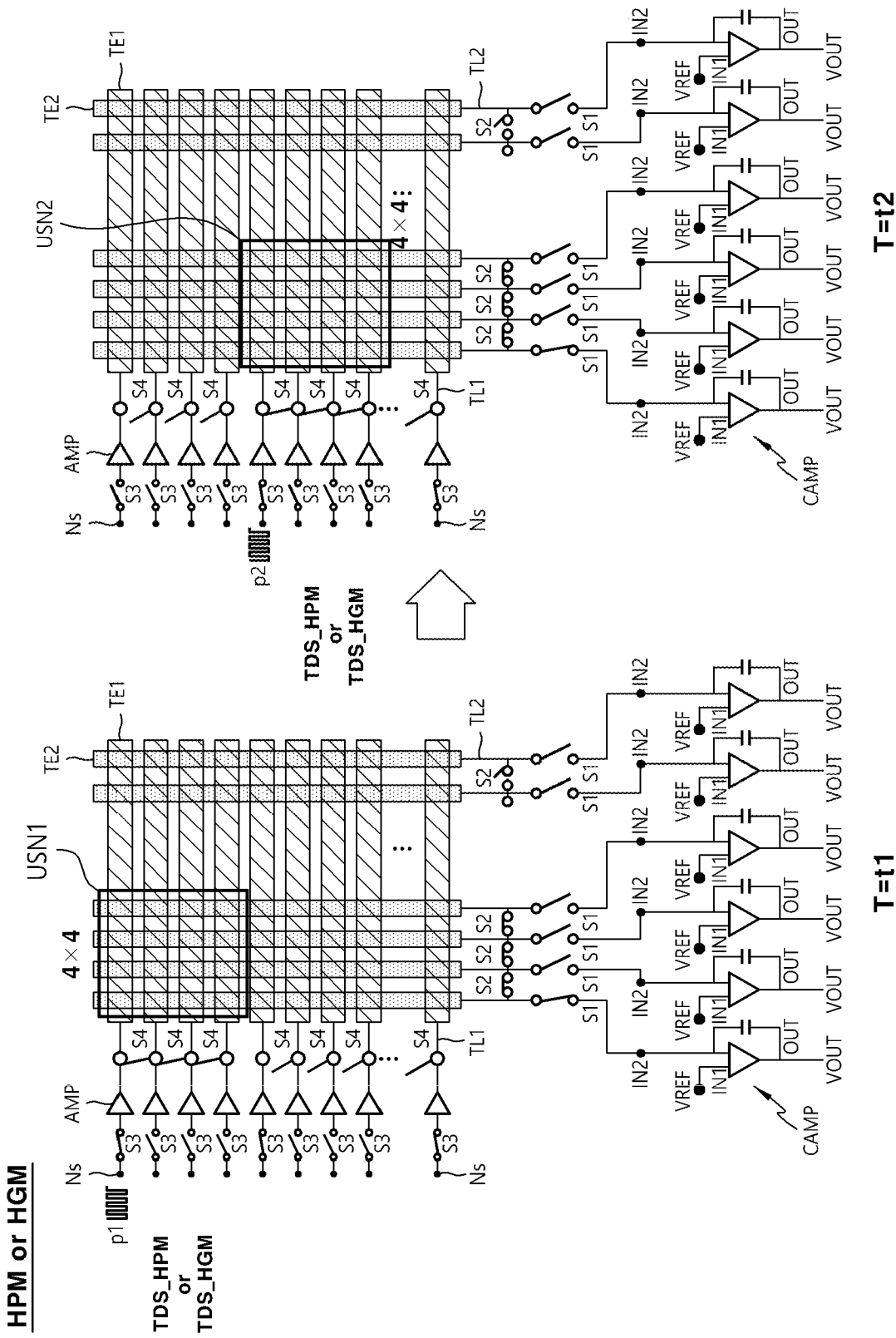
FIG. 17 illustrates an operation change according to a coded driving method in a hover pointing mode or a hover gesture mode of a touch display device according to an embodiment of the present disclosure.

FIG. 17 illustrates the operation change according to the coded driving method in the hover pointing mode HPM or the hover gesture mode HGM of the touch display device 100 according to the embodiments of the present disclosure.

FIG. 17 illustrates the operation state and the switch structure for the operation state in the first time period (T=t1) while operating in the hover pointing mode HPM or the hover gesture mode HGM, and the operation state and the switch structure for the operation state in the second time period (T=t2) after the first time period (T=t1).

In FIG. 17, the operation state and the switch structure for the operation state in the first time period (T=t1) when operating in the hover pointing mode HPM or the hover gesture mode HGM may be the same as in FIG. 14B.

In FIG. 17, for convenience of explanation, it is exemplified a case in which the size of the unit sensor node area USN1 and USN2 (e.g., N2 in FIG. 13B) in the hover pointing mode HPM and the size of the unit sensor node area USN1 and USN2 (e.g., N3 in FIG. 13C) in the hover gesture mode HGM are equal to16.

Referring to FIG. 17, during a period in which the hover mode HM is in progress, in the hover pointing mode HPM or the hover gesture mode HGM, the touch driving circuit 160 may sense the first unit sensor node area USN1 during the first time period (T=t1).

Referring to FIG. 17, in the hover pointing mode HPM or the hover gesture mode HGM, during the first time period (T=t1), one of the four third switches S3 corresponding to the first unit sensor node area USN1 may be turned on, and all of the three fourth switches S4 corresponding to the first unit sensor node area USN1 may be turned on.

In addition, referring to FIG. 17, in the hover pointing mode HPM or the hover gesture mode HGM, during the first time period (T=t1), one of the four first switches S1 corresponding to the first unit sensor node area USN1 may be turned on, and all three second switches S2 corresponding to the first unit sensor node area USN1 may be turned on.

Referring to FIG. 17, in the hover pointing mode HPM or the hover gesture mode HGM, during a first time period (T=t1), a second touch driving signal TDS_HPM or a third touch driving signal TDS_HGM may be simultaneously applied to two or more (e.g., four) first touch electrodes TE1 overlapping with or located in a first unit sensor node area USN1 among the plurality of first touch electrodes TE1 through at least one amplifier AMP among the plurality of amplifiers AMP.

Referring to FIG. 17, in the hover pointing mode HPM or the hover gesture mode HGM, during the first time period (T=t1), two or more (e.g., four) second touch electrodes TE2 overlapping with or located in the first unit sensor node area USN1 among the plurality of second touch electrodes TE2 may be electrically connected to each other by at least one (e.g., three) second switch S2 among the plurality of second switches S2.

Referring to FIG. 17, in the hover pointing mode HPM or the hover gesture mode HGM, during the first time period (T=t1), two or more (e.g., four) second touch electrodes TE2 may be electrically connected to one charge amplifier CAMP among the plurality of charge amplifiers CAMP by one first switch S1 which is turned on among the plurality of first switches S1.

Referring to FIG. 17, in the hover pointing mode HPM or the hover gesture mode HGM, during a second time period (T=t2), a second touch driving signal TDS_HPM or a third touch driving signal TDS_HGM may be simultaneously applied to two or more (e.g., four) first touch electrodes TE1 overlapping with or located in a second unit sensor node area USN2 among the plurality of first touch electrodes TE1 through at least one amplifier AMP among the plurality of amplifiers AMP.

Referring to FIG. 17, in the hover pointing mode HPM or the hover gesture mode HGM, during the second time period (T=t2), two or more (e.g., four) second touch electrodes TE2 overlapping with or located in the second unit sensor node area USN2 among the plurality of second touch electrodes TE2 may be electrically connected to each other by at least one (e.g., three) second switch S2 among the plurality of second switches S2.

Referring to FIG. 17, in the hover pointing mode HPM or the hover gesture mode HGM, during the second time period (T=t2), two or more (e.g., four) second touch electrodes TE2 overlapping with or located in the second unit sensor node area USN2 may be electrically connected to one charge amplifier CAMP among the plurality of charge amplifiers CAMP by one first switch S1 which is turned on among the plurality of first switches S1.

Referring to FIG. 17, when the display panel 110 is driven according to a coded driving method, the second touch driving signal TDS_HPM or the third touch driving signal TDS_HGM simultaneously applied to two or more first touch electrodes TE1 overlapping with or located in the second unit sensor node area USN2, and the second touch driving signal TDS_HPM or the third touch driving signal TDS_HGM simultaneously applied to two or more other first touch electrodes TE1 overlapping with or located in the first unit sensor node area USN1 may have different phases p1 and p2.

For example, the phase difference (i.e., |p1−p2|) between the second touch driving signal TDS_HPM or the third touch driving signal TDS_HGM simultaneously applied to two or more first touch electrodes TE1 overlapping with or located in the second unit sensor node area USN2 and the second touch driving signal TDS_HPM or the third touch driving signal TDS_HGM simultaneously applied to two or more other first touch electrodes TE1 overlapping with or located in the first unit sensor node area USN1 may be 180 degrees.

For example, if a second touch driving signal TDS_HPM or a third touch driving signal TDS_HGM simultaneously applied to two or more other first touch electrodes TE1 overlapping with or located in a first unit sensor node area USN1 has a first phase p1 with respect to a reference touch driving signal TDS_REF, a second touch driving signal TDS_HPM or a third touch driving signal TDS_HGM simultaneously applied to two or more first touch electrodes TE1 overlapping with or located in a second unit sensor node area USN2 may have a second phase p2 with respect to the reference touch driving signal TDS_REF. Here, the first phase p1 and the second phase p2 may be different from each other, and a difference between the first phase p1 and the second phase p2 may be, for example, 180 degrees (i.e., reverse phase).

Embodiments of the present disclosure described above are briefly described as follows.

A touch display device according to the embodiments of the present disclosure may include a touch sensor including a plurality of touch electrodes, and a touch driving circuit for driving the touch sensor.

A plurality of operating modes of the touch display device may include a contact mode for sensing a contact touch and a hover mode for sensing non-contact touches.

The contact mode may include a display mode for displaying an image and a contact touch mode for sensing the contact touch, as a plurality of detailed contact modes.

The hover mode may include the display mode, a hover pointing mode for sensing a non-contact pointing touch pointing to a point on a screen among the non-contact touches, and a hover gesture mode for sensing a non-contact gesture with movement among the non-contact touches, as a plurality of detailed hover modes.

A first touch driving signal having a first amplitude may be applied to the touch sensor in the contact touch mode.

A second touch driving signal having a second amplitude different from the first amplitude may be applied to the touch sensor in the hover pointing mode.

A third touch driving signal having a third amplitude different from the first amplitude may be applied to the touch sensor in the hover gesture mode.

The second amplitude may be greater than the first amplitude, and the third amplitude may be greater than or equal to the second amplitude.

If the contact touch mode is selected among the plurality of detailed contact modes, the number of touch electrodes overlapping with an unit sensor node area among the plurality of touch electrodes may be N1.

If the hover pointing mode is selected among the plurality of detailed hover modes, the number of touch electrodes overlapping with the unit sensor node area among the plurality of touch electrodes may be N2 greater than the N1.

If the hover gesture mode is selected among the plurality of detailed hover modes, the number of touch electrodes overlapping with the unit sensor node area among the plurality of touch electrodes may be N3 greater than or equal to the N2.

The plurality of touch electrodes may include a plurality of first touch electrodes and a plurality of second touch electrodes which intersect with each other.

If the contact touch mode is selected among the plurality of detailed contact modes, the plurality of first touch electrodes may be electrically separated from each other and the plurality of second touch electrodes may be electrically separated from each other.

If the hover pointing mode is selected among the plurality of detailed hover modes, n first touch electrodes among the plurality of first touch electrodes may be electrically connected to each other or a same second touch driving signal may be applied to the n first touch electrodes, and m second touch electrodes among the plurality of second touch electrodes may be electrically connected to each other.

If the hover gesture mode is selected among the plurality of detailed hover modes, k first touch electrodes among the plurality of first touch electrodes may be electrically connected to each other or a same third touch driving signal may be applied to the k first touch electrodes, and l second touch electrodes among the plurality of second touch electrodes may be electrically connected to each other.

A product of the n and the m may be greater than 1, and may be less than or equal to a product of the k and the l.

The display mode, the contact touch mode, the hover pointing mode, and the hover gesture mode may be distinguished by a first mode control signal, a second mode control signal, and a third mode control signal having different signal waveforms.

The first mode control signal may include a first level voltage section and a second level voltage section which are different from each other, the second mode control signal may include a third level voltage section and a fourth level voltage section which are different from each other, and the third mode control signal may include a fifth level voltage section and a sixth level voltage section which are different from each other.

When the first mode control signal is in the second level voltage section, the display mode may be selected as either a plurality of detailed contact modes or a plurality of detailed hover modes.

When the first level voltage section of the first mode control signal and the third level voltage section of the second mode control signal overlap, the contact touch mode may be selected from a plurality of detailed contact modes.

When the first level voltage section of the first mode control signal and the fourth level voltage section of the second mode control signal overlap, if the third mode control signal is in the fifth level voltage section, the hover pointing mode may be selected from a plurality of detailed hover modes.

When the first level voltage section of the first mode control signal and the fourth level voltage section of the second mode control signal overlap, if the third mode control signal is in the sixth level voltage section, the hover gesture mode may be selected from a plurality of detailed hover modes.

During a period in which the first level voltage section and the fourth level voltage section overlap, the third mode control signal may have a constant voltage level.

During a period in which the first level voltage section and the fourth level voltage section overlap, a signal applied to the touch sensor may have a constant amplitude.

During a period in which the first level voltage section and the fourth level voltage section overlap, a voltage level of the third mode control signal may be varied.

During a period in which the first level voltage section and the fourth level voltage section overlap, an amplitude of a signal applied to the touch sensor may be varied.

The period during which the first level voltage section and the fourth level voltage section overlap may include a first period and a second period.

During the first period, a signal applied to the touch sensor may have a second amplitude. During the second period, a signal applied to the touch sensor may have a third amplitude. The first period may be a portion before or after the second period.

During the period during which the first level voltage section and the third level voltage section overlap, the third mode control signal may be in a fifth level voltage section.

A signal applied to the touch sensor may be selectively varied into one of a plurality of amplitudes depending on timing.

During a period in which the first level voltage section and the third level voltage section overlap, a signal applied to the touch sensor may have the smallest amplitude among the plurality of amplitudes.

In the hover pointing mode, the second touch driving signal may be simultaneously supplied to n first touch electrodes among the plurality of first touch electrodes, and m second touch electrodes among the plurality of second touch electrodes may be electrically connected to each other. Here, n may be a natural number greater than or equal to 2, and m may be a natural number greater than or equal to 2.

In the hover gesture mode, the third touch driving signal may be simultaneously supplied to k first touch electrodes among the plurality of first touch electrodes, and l second touch electrodes among the plurality of second touch electrodes may be electrically connected to each other. Here, k may be a natural number greater than or equal to 2, and l may be a natural number greater than or equal to 2.

In the contact touch mode, the first touch driving signal may be supplied to each of the plurality of first touch electrodes, and each of the plurality of second touch electrodes may be electrically separated.

A product of the k and the l may be greater than or equal to a product of the n and the m.

The touch sensor may include a plurality of first touch electrodes and a plurality of second touch electrodes.

The touch display device according to embodiments of the present disclosure may include a plurality of amplifiers connected to the plurality of first touch electrodes, a plurality of charge amplifiers corresponding to the plurality of second touch electrodes, a plurality of first switches for controlling a connection between the plurality of second touch electrodes and the plurality of charge amplifiers, and a plurality of second switches for controlling a connection between two adjacent second touch electrodes among the plurality of second touch electrodes.

An on-off of the plurality of first switches and the plurality of second switches may be controlled depending on a touch sensing mode selected from the contact touch mode, the hover pointing mode, and the hover gesture mode.

In the contact touch mode, the first touch driving signal may be applied to each of the plurality of first touch electrodes through a corresponding amplifier among the plurality of amplifiers, and all of the plurality of second switches may be turned off, so that the plurality of second touch electrodes may be electrically separated from each other, and the plurality of second touch electrodes may be electrically connected to the plurality of charge amplifiers by the plurality of first switches.

In the hover pointing mode or the hover gesture mode, during a first time period, the second touch driving signal or the third touch driving signal may be simultaneously applied to two or more first touch electrodes overlapping with a first unit sensor node area among the plurality of first touch electrodes by at least one amplifier among the plurality of amplifiers, and two or more second touch electrodes overlapping with the first unit sensor node area among the plurality of second touch electrodes may be electrically connected to each other by at least one second switch among the plurality of second switches, and the two or more second touch electrodes may be electrically connected to one charge amplifier among the plurality of charge amplifiers by one first switch among the plurality of first switches.

In the hover pointing mode or the hover gesture mode, during a second time period after the first time period, the second touch driving signal or the third touch driving signal may be simultaneously applied to two or more other first touch electrodes overlapping with a second unit sensor node area different from the first unit sensor node area among the plurality of first touch electrodes by at least one other amplifier among the plurality of amplifiers, and two or more second touch electrodes overlapping with the second unit sensor node area among the plurality of second touch electrodes may be electrically connected to each other by at least one second switch among the plurality of second switches, and the two or more second touch electrodes overlapping with the second unit sensor node area may be electrically connected to one charge amplifier among the plurality of charge amplifiers by one first switch among the plurality of first switches.

When driven according to a non-coded driving method, the second touch driving signal or the third touch driving signal simultaneously applied to two or more first touch electrodes overlapping with the first unit sensor node area and the second touch driving signal or the third touch driving signal simultaneously applied to two or more other first touch electrodes overlapping with the second unit sensor node area may have the same phase.

Alternatively or additionally, when driven according to a coded driving method, the second touch driving signal or the third touch driving signal simultaneously applied to two or more first touch electrodes overlapping with the first unit sensor node area and the second touch driving signal or the third touch driving signal simultaneously applied to two or more other first touch electrodes overlapping with the second unit sensor node area may have different phases.

The touch driving circuit of a touch display device according to embodiments of the present disclosure may further include a plurality of third switches between a plurality of signal input nodes and the plurality of amplifiers, and a plurality of fourth switches for controlling a connection between two adjacent first touch electrodes among the plurality of first touch electrodes.

Depending on the touch sensing mode selected among the hover pointing mode, the hover gesture mode, and the contact touch mode, the number of third switches turned on among the plurality of third switches may vary, and the number of fourth switches turned on among the plurality of fourth switches may vary.

A driving circuit of a touch display device according to embodiments of the present disclosure may include a signal generation unit configured to generate a touch driving signal to be applied to at least one of a plurality of touch electrodes based on a reference touch driving signal depending on a touch sensing mode selected from among a plurality of touch sensing modes, and a signal output unit configured to output the touch driving signal to the at least one touch electrode.

The driving circuit may include a plurality of operating modes including a contact mode for sensing a contact touch and a hover mode for sensing non-contact touches.

The contact mode may include a display mode for displaying an image and a contact touch mode for sensing the contact touch. The hover mode may include the display mode, a hover pointing mode for sensing a non-contact pointing touch pointing to a point on a screen among the non-contact touches, and a hover gesture mode for sensing a non-contact gesture with movement among the non-contact touches.

The signal generation unit may generate the touch driving signal corresponding to a touch sensing mode selected among the plurality of touch sensing modes including the contact touch mode, the hover pointing mode, and the hover gesture mode, based on a plurality of mode control signals having different signal waveforms. For example, the plurality of mode control signals may include a first mode control signal, a second mode control signal, and a third mode control signal.

The touch driving signal may be a first touch driving signal having a first amplitude when the contact touch mode is selected as the touch sensing mode.

The touch driving signal may be a second touch driving signal having a second amplitude different from the first amplitude when the hover pointing mode is selected as the touch sensing mode.

The touch driving signal may be a third touch driving signal having a third amplitude different from the first amplitude when the hover gesture mode is selected as the touch sensing mode.

A driving method of a touch display device according to embodiments of the present disclosure may include operating in a hover mode including a display mode, a hover pointing mode, and a hover gesture mode, determining an intensity of a sensing signal for a touch sensor, operating, if the intensity of the sensing signal is above a predetermined level, in a contact mode including a display mode and a contact touch mode, and performing a contact algorithm based on a result of operating in the contact mode to determine a coordinate for a contact touch, determining, if the intensity of the sensing signal is below (lower than) the predetermined level, whether or not there is a movement characteristic based on the sensing signal, determining, if there is no movement characteristic based on the sensing signal, a coordinate for a hover touch while operating in the hover mode, and determining, if there is a movement characteristic based on the sensing signal, a hover gesture while operating in the hover mode.

A first touch driving signal having a first amplitude may be applied to the touch sensor while the contact touch mode is in progress.

A second touch driving signal having a second amplitude different from the first amplitude may be applied to the touch sensor while the hover pointing mode is in progress.

A third touch driving signal having a third amplitude different from the first amplitude may be applied to the touch sensor while the hover gesture mode is in progress.

The second amplitude may be greater than the first amplitude, and the third amplitude may be greater than or equal to the second amplitude.

According to embodiments of the present disclosure, it is possible to provide a touch display device, a driving circuit and a driving method capable of supporting various touch sensing modes.

According to embodiments of the present disclosure, it is possible to provide a touch display device, a driving circuit and a driving method capable of efficiently sensing a contact touch, a non-contact pointing touch pointing to a point on a screen (e.g., hover pointing touch), and a non-contact gesture with a movement (e.g., hover gesture).

According to embodiments of the present disclosure, it is possible to provide a touch display device, a driving circuit and a driving method having a control signal system capable of efficiently supporting three touch sensing modes including a contact touch mode, a hover pointing mode for sensing a non-contact pointing touch pointing to a point on a screen, and a hover gesture mode for sensing a non-contact gesture with movement, and a display mode.

According to embodiments of the present disclosure, under the control signal system, the hover mode and the contact mode may be distinguished and operated through time periods and mode control signals (for example, which may be a type of interrupt signal). Here, for example, the mode control signals may be treated as a type of interrupt signal.

According to embodiments of the present disclosure, by applying the control signal system, there may be reduced an error rate between operating modes that may occur in the hover mode and the contact mode, and there may be improved the operation reliability for each operating mode.

According to embodiments of the present disclosure, channel binding based on switching control (see FIGS. 13A, 13B, 13C, 14A, 14B, 15, 16A, 16B, and 17) may be controlled differently for each of various touch sensing modes including a contact touch mode, a hover pointing mode, and a hover gesture mode, thereby providing efficient operation.

According to embodiments of the present disclosure, there may provide a low-power operation by efficiently performing various operating modes, such as a display mode, a contact touch mode, a hover pointing mode, and a hover gesture mode, in terms of operation time.

The above description and the accompanying drawings provide an example of the technical idea of the present disclosure for illustrative purposes only. Various modifications, additions and substitutions to the described embodiments will be readily apparent to those skilled in the art without departing from the spirit and scope of the present disclosure. In addition, the disclosed embodiments are intended to illustrate the scope of the technical idea of the present disclosure. Thus, the scope of the present disclosure is not limited to the embodiments shown.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device comprising:
a touch sensor including a plurality of touch electrodes; and
a touch driving circuit configured to drive the touch sensor,
wherein operating modes of the touch display device include a contact mode for sensing a contact touch and a hover mode for sensing non-contact touches,
wherein the contact mode includes a display mode for displaying an image and a contact touch mode for sensing the contact touch,
wherein the hover mode includes the display mode, a hover pointing mode for sensing a non-contact pointing touch pointing to a point on a screen among the non-contact touches, and a hover gesture mode for sensing a non-contact gesture with movement among the non-contact touches,
wherein a first touch driving signal having a first amplitude is configured to be applied to the touch sensor in the contact touch mode,
wherein a second touch driving signal having a second amplitude different from the first amplitude is configured to be applied to the touch sensor in the hover pointing mode, and
wherein a third touch driving signal having a third amplitude different from the first amplitude is configured to be applied to the touch sensor in the hover gesture mode.

2. The touch display device of claim 1, wherein the second amplitude is greater than the first amplitude, and the third amplitude is greater than or equal to the second amplitude.

3. The touch display device of claim 1, wherein, in the contact touch mode, a number of touch electrodes overlapping with a unit sensor node area among the plurality of touch electrodes is N1,
wherein, in the hover pointing mode, the number of touch electrodes overlapping with the unit sensor node area among the plurality of touch electrodes is N2 greater than the N1,
wherein, in the hover gesture mode, the number of touch electrodes overlapping with the unit sensor node area among the plurality of touch electrodes is N3 greater than or equal to the N2.

4. The touch display device of claim 1, wherein the plurality of touch electrodes include a plurality of first touch electrodes and a plurality of second touch electrodes which intersect with each other,
wherein, in the contact touch mode, the plurality of first touch electrodes are electrically separated from each other and the plurality of second touch electrodes are electrically separated from each other,
wherein, in the hover pointing mode, n first touch electrodes among the plurality of first touch electrodes are electrically connected to each other or a same second touch driving signal is applied to the n first touch electrodes, and m second touch electrodes among the plurality of second touch electrodes are electrically connected to each other,
wherein, in the hover gesture mode, k first touch electrodes among the plurality of first touch electrodes are electrically connected to each other or a same third touch driving signal is applied to the k first touch electrodes, and l second touch electrodes among the plurality of second touch electrodes are electrically connected to each other,
wherein a product of the n and the m is greater than 1 and less than or equal to a product of the k and the l.

5. The touch display device of claim 1, wherein the display mode, the contact touch mode, the hover pointing mode, and the hover gesture mode are distinguished by a first mode control signal, a second mode control signal, and a third mode control signal having different signal waveforms,
wherein the first mode control signal includes a first level voltage section and a second level voltage section which are different from each other, the second mode control signal includes a third level voltage section and a fourth level voltage section which are different from each other, and the third mode control signal includes a fifth level voltage section and a sixth level voltage section which are different from each other.

6. The touch display device of claim 5, wherein, when the first mode control signal is in the second level voltage section, the display mode operates in the contact mode or the hover mode,
wherein, when the first level voltage section of the first mode control signal and the third level voltage section of the second mode control signal overlap, the contact touch mode is selected,
wherein, when the first level voltage section of the first mode control signal and the fourth level voltage section of the second mode control signal overlap, if the third mode control signal is in the fifth level voltage section, the hover pointing mode is selected,
wherein, when the first level voltage section of the first mode control signal and the fourth level voltage section of the second mode control signal overlap, if the third mode control signal is in the sixth level voltage section, the hover gesture mode is selected.

7. The touch display device of claim 5, wherein, during a period in which the first level voltage section and the fourth level voltage section overlap, the third mode control signal has a constant voltage level, and a signal applied to the touch sensor has a constant amplitude.

8. The touch display device of claim 5, wherein, during a period in which the first level voltage section and the fourth level voltage section overlap, a voltage level of the third mode control signal is varied, and an amplitude of a signal applied to the touch sensor is varied.

9. The touch display device of claim 5, wherein a signal applied to the touch sensor is selectively varied into one of a plurality of amplitudes based on timing,
wherein, during a period in which the first level voltage section and the third level voltage section overlap, a signal applied to the touch sensor has the smallest amplitude among the plurality of amplitudes, and the third mode control signal is in the fifth level voltage section.

10. The touch display device of claim 1, wherein the touch sensor includes a plurality of first touch electrodes and a plurality of second touch electrodes, wherein, in the contact touch mode, the first touch driving signal is supplied to each of the plurality of first touch electrodes, and each of the plurality of second touch electrodes is electrically separated, wherein, in the hover pointing mode, the second touch driving signal is simultaneously supplied to n first touch electrodes among the plurality of first touch electrodes, where n is a natural number greater than or equal to 2, and m second touch electrodes among the plurality of second touch electrodes are electrically connected to each other, where m is a natural number greater than or equal to 2, wherein, in the hover gesture mode, the third touch driving signal is simultaneously supplied to k first touch electrodes among the plurality of first touch electrodes, where k is a natural number greater than or equal to 2, and I second touch electrodes among the plurality of second touch electrodes are electrically connected to each other, where I is a natural number greater than or equal to 2, wherein a product of the k and the I is greater than or equal to a product of the n and the m.

11. The touch display device of claim 10, wherein the touch driving circuit includes:

a plurality of amplifiers connected to the plurality of first touch electrodes;

a plurality of charge amplifiers corresponding to the plurality of second touch electrodes;

a plurality of first switches for controlling a connection between the plurality of second touch electrodes and the plurality of charge amplifiers; and a plurality of second switches for controlling a connection between two adjacent second touch electrodes among the plurality of second touch electrodes, wherein an on-off of the plurality of first switches and the plurality of second switches is controlled based on a touch sensing mode selected from the contact touch mode, the hover pointing mode, and the hover gesture mode.

12. The touch display device of claim 11, wherein, in the contact touch mode, the first touch driving signal is configured to be applied to each of the plurality of first touch electrodes through each of the plurality of amplifiers, and all of the plurality of second switches are configured to be turned off, so that the plurality of second touch electrodes are electrically separated from each other, and the plurality of second touch electrodes are electrically connected to the plurality of charge amplifiers by the plurality of first switches.

13. The touch display device of claim 11, wherein, in the hover pointing mode or the hover gesture mode, during a first time period, the second touch driving signal or the third touch driving signal is configured to be simultaneously applied to two or more first touch electrodes overlapping with a first unit sensor node area among the plurality of first touch electrodes by at least one amplifier among the plurality of amplifiers, two or more second touch electrodes overlapping with the first unit sensor node area among the plurality of second touch electrodes are electrically connected to each other by at least one second switch among the plurality of second switches, and the two or more second touch electrodes are electrically connected to one charge amplifier among the plurality of charge amplifiers by one first switch among the plurality of first switches.

14. The touch display device of claim 13, wherein, in the hover pointing mode or the hover gesture mode, during a second time period after the first time period, the second touch driving signal or the third touch driving signal is configured to be simultaneously applied to two or more other first touch electrodes overlapping with a second unit sensor node area different from the first unit sensor node area among the plurality of first touch electrodes by at least one other amplifier among the plurality of amplifiers, two or more second touch electrodes overlapping with the second unit sensor node area among the plurality of second touch electrodes are electrically connected to each other by at least one second switch among the plurality of second switches, and the two or more second touch electrodes are electrically connected to one charge amplifier among the plurality of charge amplifiers by one first switch among the plurality of first switches, wherein the second touch driving signal or the third touch driving signal simultaneously applied to two or more first touch electrodes overlapping with the first unit sensor node area and the second touch driving signal or the third touch driving signal simultaneously applied to two or more other first touch electrodes overlapping with the second unit sensor node area have the same phase.

15. The touch display device of claim 13, wherein, in the hover pointing mode or the hover gesture mode, during a second time period after the first time period, the second touch driving signal or the third touch driving signal is configured to be simultaneously applied to two or more other first touch electrodes overlapping with the second unit sensor node area among the plurality of first touch electrodes by at least one other amplifier among the plurality of amplifiers, two or more second touch electrodes overlapping with the second unit sensor node area among the plurality of second touch electrodes are electrically connected to each other by at least one second switch among the plurality of second switches, and the two or more second touch electrodes are electrically connected to one charge amplifier among the plurality of charge amplifiers by one first switch among the plurality of first switches, wherein the second touch driving signal or the third touch driving signal simultaneously applied to two or more first touch electrodes overlapping with the first unit sensor node area and the second touch driving signal or the third touch driving signal simultaneously applied to two or more other first touch electrodes overlapping with the second unit sensor node area have different phases.

16. The touch display device of claim 11, wherein the touch driving circuit further includes a plurality of third switches between a plurality of signal input nodes and the plurality of amplifiers, and a plurality of fourth switches for controlling a connection between two adjacent first touch electrodes among the plurality of first touch electrodes, wherein, based on the touch sensing mode selected among the hover pointing mode, the hover gesture mode, and the contact touch mode, the number of third switches turned on among the plurality of third switches varies, and the number of fourth switches turned on among the plurality of fourth switches varies.

17. A driving circuit of a touch display device comprising:
a signal generation unit configured to generate a touch driving signal to be applied to at least one touch electrode of a plurality of touch electrodes based on a reference touch driving signal based on a touch sensing mode selected from among a plurality of touch sensing modes; and
a signal output unit configured to output the touch driving signal to the at least one touch electrode,
wherein the driving circuit includes a plurality of operating modes including a contact mode for sensing a contact touch and a hover mode for sensing non-contact touches,
wherein the contact mode includes a display mode for displaying an image and a contact touch mode for sensing the contact touch,
wherein the hover mode includes the display mode, a hover pointing mode for sensing a non-contact pointing touch pointing to a point on a screen among the non-contact touches, and a hover gesture mode for sensing a non-contact gesture with movement among the non-contact touches,
wherein signal generation unit generates the touch driving signal corresponding to a touch sensing mode selected among the plurality of touch sensing modes including the contact touch mode, the hover pointing mode, and the hover gesture mode, based on a plurality of mode control signals having different signal waveforms.

18. The driving circuit of claim 17, wherein the touch driving signal is a first touch driving signal having a first amplitude when the contact touch mode is selected as the touch sensing mode,
wherein the touch driving signal is a second touch driving signal having a second amplitude different from the first amplitude when the hover pointing mode is selected as the touch sensing mode, and
wherein the touch driving signal is a third touch driving signal having a third amplitude different from the first amplitude when the hover gesture mode is selected as the touch sensing mode.

19. A driving method of a touch display device comprising:
operating in a hover mode including a display mode, a hover pointing mode, and a hover gesture mode;
determining an intensity of a sensing signal for a touch sensor;
operating, if the intensity of the sensing signal is above a predetermined level, in a contact mode including a display mode and a contact touch mode, and performing a contact algorithm based on a result of operating in the contact mode to determine a coordinate for a contact touch;
determining, if the intensity of the sensing signal is lower than the predetermined level, whether or not there is a movement characteristic based on the sensing signal;
determining, if there is no movement characteristic based on the sensing signal, a coordinate for a hover touch while operating in the hover mode; and
determining, if there is a movement characteristic based on the sensing signal, a hover gesture while operating in the hover mode,
wherein a first touch driving signal having a first amplitude is applied to the touch sensor while the contact touch mode is in progress,
wherein a second touch driving signal having a second amplitude different from the first amplitude is applied to the touch sensor while the hover pointing mode is in progress, and
wherein a third touch driving signal having a third amplitude different from the first amplitude is applied to the touch sensor while the hover gesture mode is in progress.

20. The driving method of claim 19, wherein the second amplitude is greater than the first amplitude, and the third amplitude is greater than or equal to the second amplitude.

* * * * *